United States Patent
Nakanishi et al.

(10) Patent No.: US 7,324,669 B2
(45) Date of Patent: Jan. 29, 2008

(54) IMAGE PROCESSING DEVICE AND IMAGE PROCESSING METHOD, AND IMAGING DEVICE

(75) Inventors: Toshiaki Nakanishi, Chiba (JP); Kyoko Sugizaki, Kanagawa (JP); Hiroaki Takano, Kanagawa (JP)

(73) Assignee: Sony Corporation, Tokyo (JP)

( * ) Notice: Subject to any disclaimer, the term of this patent is extended or adjusted under 35 U.S.C. 154(b) by 376 days.

(21) Appl. No.: 10/543,163

(22) PCT Filed: Jan. 27, 2004

(86) PCT No.: PCT/JP2004/000701

§ 371 (c)(1),
(2), (4) Date: Jul. 21, 2005

(87) PCT Pub. No.: WO2004/068408

PCT Pub. Date: Aug. 12, 2004

(65) Prior Publication Data

US 2006/0133654 A1 Jun. 22, 2006

(30) Foreign Application Priority Data

Jan. 31, 2003 (JP) .............................. 2003-025234

(51) Int. Cl.
*G06K 9/00* (2006.01)
*G06K 9/46* (2006.01)
*G06K 9/62* (2006.01)
*G06K 9/36* (2006.01)

(52) U.S. Cl. ...................... 382/118; 104/224; 104/286; 104/203

(58) Field of Classification Search ................ 382/100, 382/103–104, 118, 224
See application file for complete search history.

(56) References Cited

U.S. PATENT DOCUMENTS

| 6,529,617 | B1 * | 3/2003 | Prokoski | 382/128 |
| 7,212,674 | B1 * | 5/2007 | Takemoto | 382/209 |
| 2002/0006226 | A1 * | 1/2002 | Shiota | 382/203 |
| 2003/0161506 | A1 * | 8/2003 | Velazquez et al. | 382/118 |
| 2005/0100243 | A1 * | 5/2005 | Shum et al. | 382/276 |

(Continued)

FOREIGN PATENT DOCUMENTS

JP 09-161086 6/1997

(Continued)

*Primary Examiner*—Samir Ahmed
*Assistant Examiner*—Nathan Bloom
(74) *Attorney, Agent, or Firm*—Sonnenschein Nath & Rosenthal LLP

(57) ABSTRACT

Disclosed is an image processing apparatus in which the cheek of a person captured in an image of a photo may be corrected to a finish with the cheek looking slimmer than in a two-dimensional photo. A face correction unit (400) calculates, in a calculation unit (411), a face length L1 and a cheek width L2 of a face of a person as an object and L3 corrected from the face length L1. A face classifying unit (412) compares L2 and L3 to each other to classify the face shape into a 'round shape', 'a long shape' and a 'square shape'. Depending on the results of classification, the image trimming is carried out by a first contour correction unit (413), a second contour correction unit (414), and a third contour correction unit (415) so that the cheek will look slim.

26 Claims, 22 Drawing Sheets

U.S. PATENT DOCUMENTS

| | | | |
|---|---|---|---|
| 2005/0180657 A1* | 8/2005 | Zhang et al. | 382/294 |
| 2006/0104478 A1* | 5/2006 | Fukuma et al. | 382/100 |

FOREIGN PATENT DOCUMENTS

| | | |
|---|---|---|
| JP | 2000-011143 | 1/2000 |
| JP | 2000-267156 | 9/2000 |
| JP | 2001-209817 | 8/2001 |
| JP | 2001-218010 | 8/2001 |

\* cited by examiner

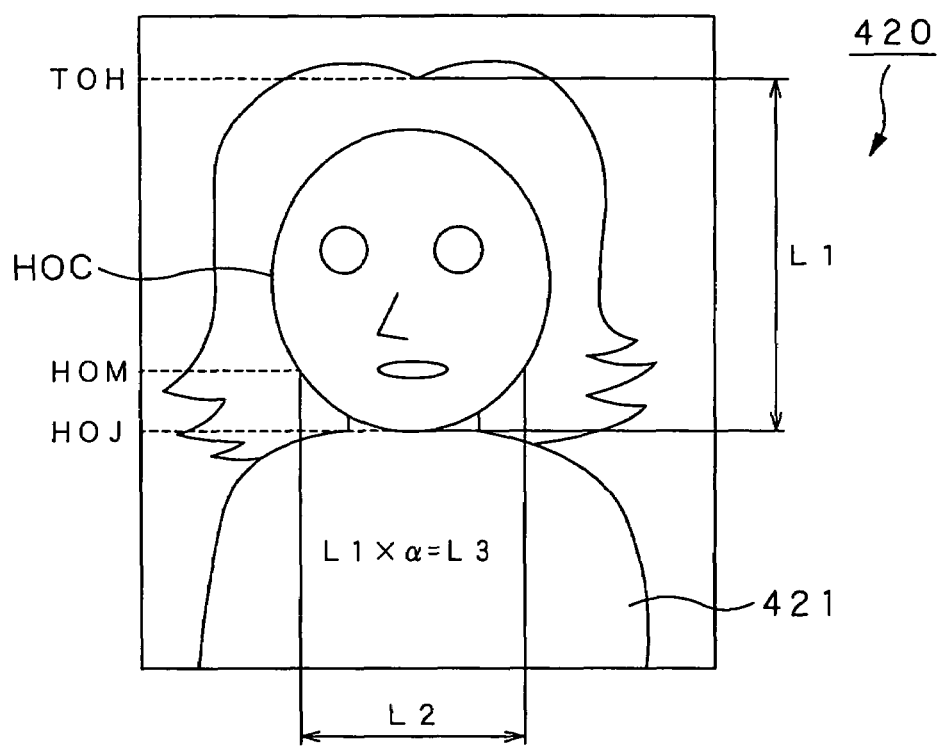
FIG.1
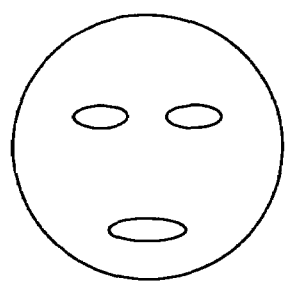
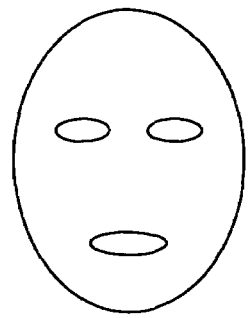
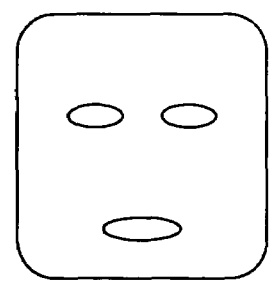
FIG.2A   FIG.2B   FIG.2C

Area map

IMAGE PROCESSING DEVICE AND IMAGE PROCESSING METHOD, AND IMAGING DEVICE

TECHNICAL FIELD

This invention relates to an image processing apparatus and an image processing method for correcting an image in which a person as an object of a photo for identification has been shot, and an imaging apparatus provided with such image processing apparatus.

This application claims priority of Japanese Patent Application 2003-25324, filed in Japan on Jan. 31, 2003, the entirety of which is incorporated by reference herein.

BACKGROUND ART

In imaging a person as an object for taking a portrait photo or a photo for identification or attestation, in e.g. a photo studio, the imaging is carried out as the arranging position of a lighting device used for illuminating the object, or the orientation of the object imaging by a camera equipment as an imaging apparatus, is adjusted for improving the appearance of the object.

This adjustment is carried out based on the technique or know-how acquired through practice in a photo studio. Hence, the adjustment may vary from one photo studio to another. The photo produced in the photo studio is printed on a photographic paper sheet by e.g. a developing unit for use as a portrait photo or a photo for identification.

In the photo studio, variegated lighting devices or camera equipment for producing a good-looking photo, are needed, while variegated techniques or know-how are needed for producing a photo, such as a method used for illuminating an object or the imaging direction used for capturing an image.

In particular, there are needed diverse techniques or know-how in illumination, such as angle, height, difference in lightness of illumination on the left and right sides, that is, the illumination difference. Thus, the shading on the object may be varied by illumination adjustment, thus possibly influencing the finish of the photo.

In the conventional imaging technique, the object is illuminated by an illuminating device, such as stroboscopic device, ancillary to the photographic device, light is illuminated from the front side of the object, the shade of the object is eliminated and only a flat photo devoid of depth is produced.

In the flat photo, the face of the photo captured is insipid and the forehead looks broad, so that the photo when seen by the person as the object cannot be said to be a good-looking photo. In particular, when the person as the object is a female, she desires that her cheek looks slim. The female tends to be more anxious than the male about how she looks in the photo.

On the other hand, the person as an object is sensitive to his/her face in the photo and becomes aware of the slightest difference in the manner how he/she comes out in the photo, even though such difference may not be noticed by others.

There is proposed in Japanese Laid-Open Patent Publication 2001-218020 a technique in which image processing is carried out by e.g. a computer, without direct printing a photo on the photographic paper sheet, with a view to improving the appearance of the photo without relying on the above know-how, especially when the object is a female. The technique disclosed in this Publication performs image processing for making up the face of the person as the object and is not up to the requirement for photographing so that the cheek of the object will look slim.

DISCLOSURE OF THE INVENTION

It is an object of the present invention to provide an image processing apparatus and an image processing method whereby the aforementioned problems of the related art may be overcome, and an imaging apparatus having the image processing apparatus.

It is another object of the present invention to provide an image processing apparatus and an image processing method whereby the object of the person as captured may be corrected to a good-looking photo which will be satisfactory for the person as an object.

For accomplishing these objects, the present invention provides an image processing apparatus comprising face area extraction means for extracting a face area from an image of a person, detection means for detecting the contour of the face of the person from the face area extracted by the face area extraction means, face classification means for classifying the shape of the face of the person, based on the contour of the face of the person as detected by the detection means, and image correcting means for correcting the contour of the face of the person based on the type of the face shape of the person classified by the face classification means.

The present invention also provides an image processing method comprising face area extraction step for extracting a face area from an image of a person, detection step for detecting the contour of the face of the person from the face area extracted by the face area extraction step, face classification step for classifying the shape of the face of the person, based on the contour of the face of the person as detected by the detection step, and image correcting step for correcting the contour of the face of the person based on the type of the face shape of the person classified by the face classification step.

The present invention also provides an imaging apparatus comprising imaging means for imaging a person, face area extraction means for extracting a face area from an image of a person imaged by the imaging means, detection means for detecting the contour of the face of the person from the face area extracted by the face area extraction means, face classification means for classifying the shape of the face of the person based on the contour of the face of the person detected by the detection means, and image correction means for correcting the contour of the face of the person based on the type of the face of the face classified by the face classification means.

According to the present invention, in which the shape of the face of a person is classified, based on an image of a person input, and the contour of his/her person is corrected by image correcting means, based on the results of classification, such an attractive photo may automatically be produced in which the contour of the person looks slim.

Other objects and specific advantages of the present invention will become more apparent from the following explanation of preferred embodiments thereof especially when read in conjunction with the drawings.

BRIEF DESCRIPTION OF THE DRAWINGS

FIG. 1 is a schematic view showing a layout for a person in a photo for identification.

FIGS. 2A to 2C are schematic views showing illustrative classification of the shape of faces of persons in the photos of identification.

BEST MODE FOR CARRYING OUT THE INVENTION

Figure 3:
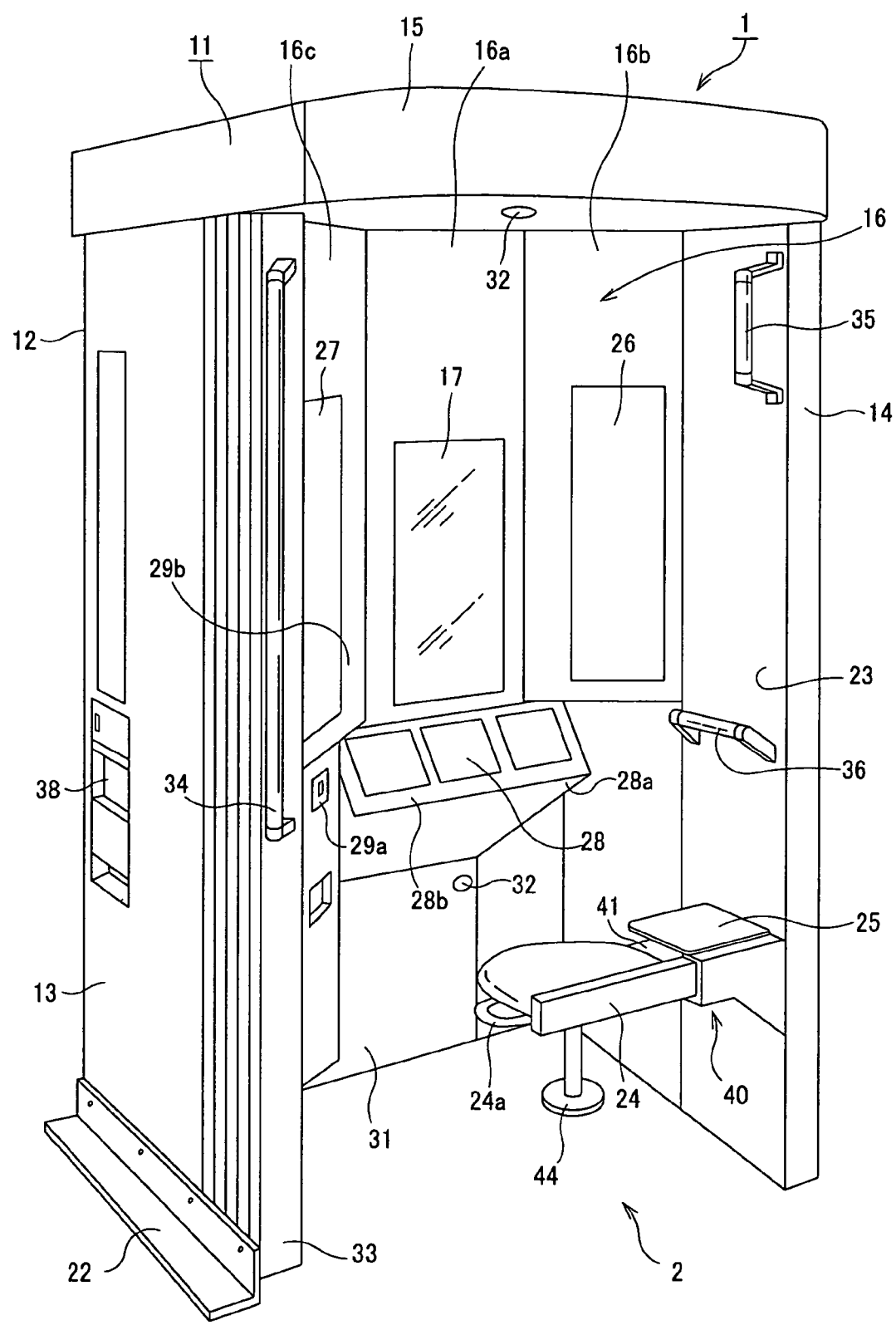
FIG. 3 is a perspective view of an imaging apparatus according to the present invention, when looking from the front side.

Referring to the drawings, concrete embodiments of the present invention will now be explained in detail. The present embodiment is directed to an image processing apparatus in which the contour of the faces of persons are detected from images of these persons as shot to classify the face shapes and in which the face contours are corrected in the images of the persons based on the so classified face shapes of the persons.

FIG. 1 is a schematic view showing the standard for classifying the shapes of the faces of the persons in the data of the images of the persons in the photos for identification.

Referring to FIG. 1, in data of an image of a person 420, the length from the head top TOH of a person 421 to the jaw HOJ is L1, the width of a cheek HOC at the location of a mouth HOM of the person 421 is L2, and a value corresponding to the length L1 multiplied with a preset coefficient ɳ is L3.

Although not explained in detail, the coefficient ɳ is a value representing the ratio of L1 to L3, and is set to give a well-balanced L1/L3 ratio.

With the image processing apparatus of the present embodiment, the shape of a face of the person 421, as an object, is classified, from the input image data input 420, to be a 'round face', when L2=L3, as shown in FIG. 2A, an 'oval-shaped or long face' when L2<L3, as shown in FIG. 2B, or a 'square-shaped face' when L2>L3, as shown in FIG. 2C. Based on the shape of the face, as classified, image correction is made so that the contour of the face will look slim to provide for better appearance of the image data of the person 420.

The image processing apparatus of the present invention is used for correcting the contour of the face of the person by image processing in a photo booth for e.g. an apparatus for taking a photo for identification. The present invention will now be explained in accordance with the following sequence:

A. Photo Booth

B. Image Processing Apparatus (1) Skin area extracting unit
   (1-1) Color conversion process
   (1-2) Histogram generating process
   (1-3) Initial cluster generating process
   (1-4) Initial area extraction process
   (1-5) Cluster integrating process
   (1-6) Area splitting process
   (1-7) Area extracting step (2) Object Detection Unit
   (2-1) Detection of head top of person
   (2-2) Detection of mouth of person
   (2-3) Detection of eyes of person
   (2-4) Detection of jaw of person
   (2-5) Detection of centerline of face of person
   (2-6) Detection of cheek of person (2-7) Correction of rectangular area
(2-8) Decision of face (3) Face Detection Unit
 (3-1) Calculation of face length and cheek width of person
 (3-2) Face classification
 (3-3a) Image correction a
 (3-3b) image correction b
 (3-3c) image correction c First, the photo booth, the image processing apparatus according to the present invention is provided to, is explained.

A. Photo Booth

Figure 4:
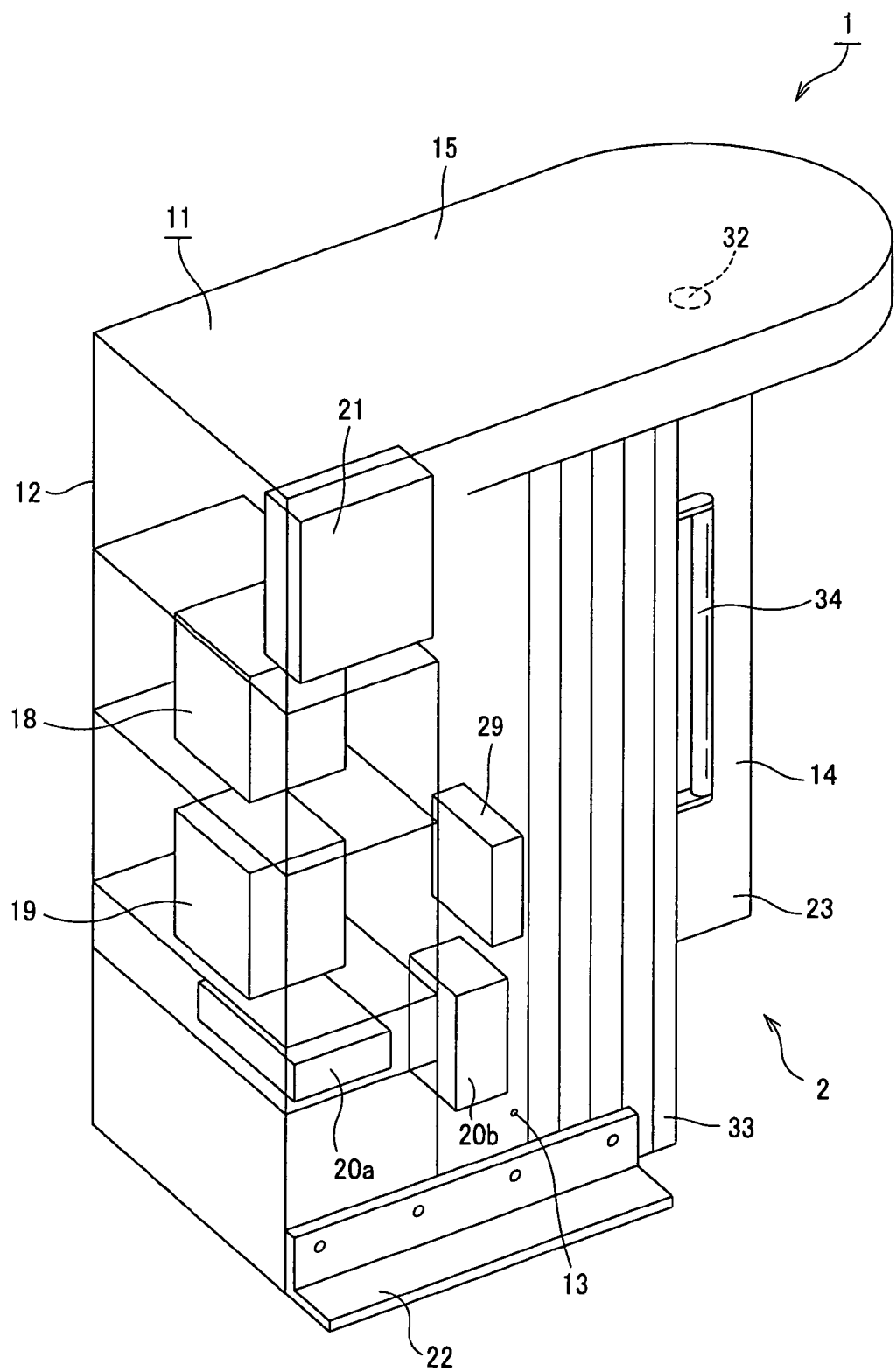
FIG. 4 is a perspective view of the imaging apparatus, when looking from the back side.
Figure 5:
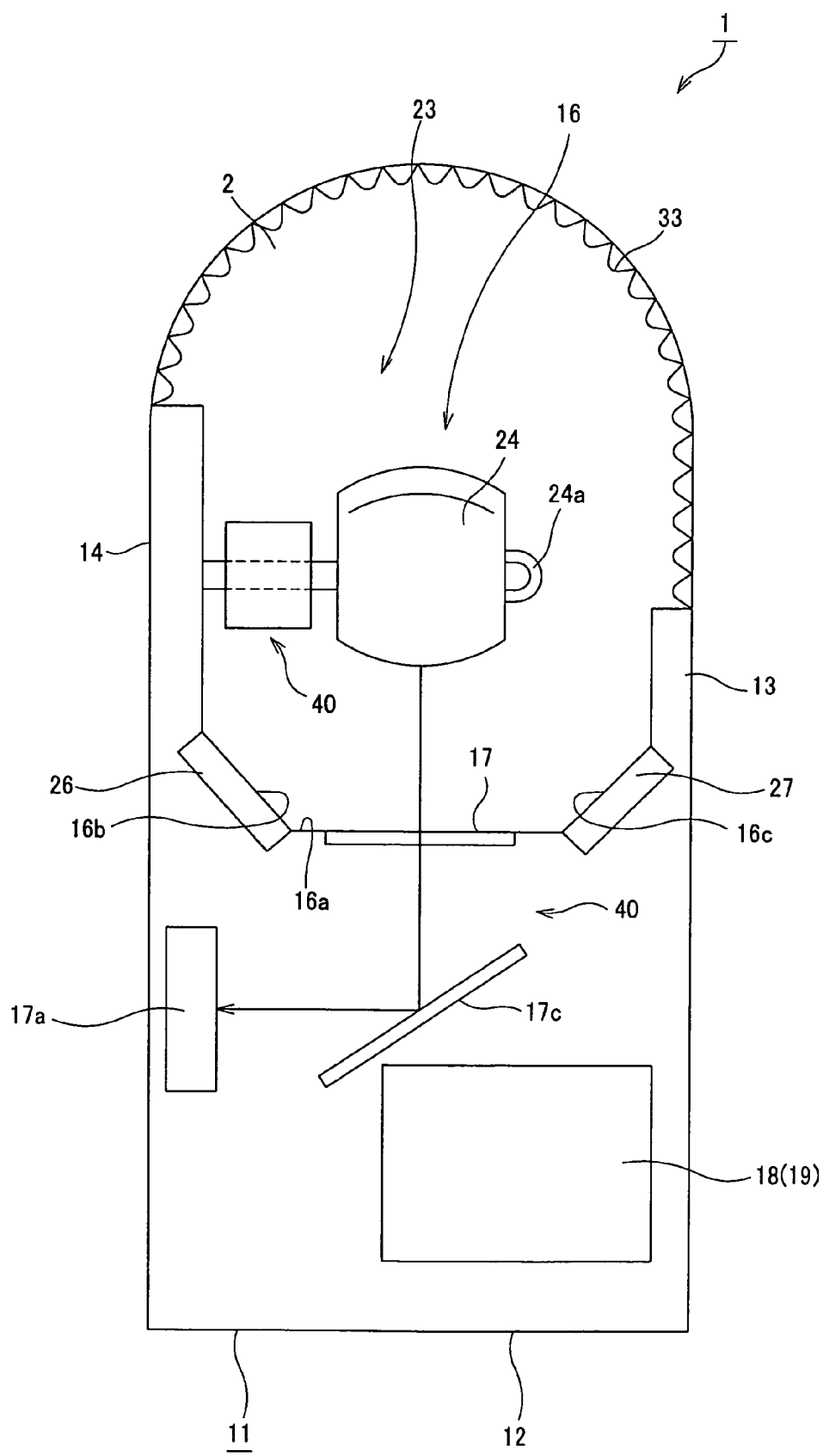
FIG. 5 is a see-through plan view showing the inner part of the imaging apparatus.

Referring to FIGS. 3 to 5, an imaging apparatus 1 forms a photo booth used for taking a photo for identification, and includes a casing 11 forming a main body unit. The casing 11 includes sidewall sections 13, 14, provided facing each other on a back side section 12, and a top plate 15 provided bridging the sidewall sections 13, 14 to form a ceiling. An imaging chamber 16 is provided in a space defined by the back side section 12, sidewall sections 13, 14 and by the top plate 15. Within the inside of the back side section 12, faced by the person as an object when he/she has entered the imaging chamber 16, there are enclosed an imaging unit 17, for imaging the person as object, a first printer 18 and a second printer 19 for printing an image shot by the imaging unit 17, and a main substrate 21, on which there are fitted a variety of electrical circuits, such as an image processing circuit or a control circuit. The image processing circuit performs image processing operations, such as the processing operation of converting the image signals, output from the imaging unit 17, from analog signals into digital signals, while the control circuit controls the overall operations.

The imaging unit 17 includes an imaging apparatus 17a, having imaging devices, such as CCD (charge-coupled device) or CMOS (complementary metal-oxide semiconductor device), a half mirror 17b provided to a surface of the imaging chamber 16 faced by the person as an object, and a reflecting surface 17c, reflecting the light transmitted through the half mirror 17b.

When imaging a person as an object, the half mirror 17b reflects a predetermined proportion of the light from the person as an object to permit the person as the object to see his/her face, while transmitting the remaining light to permit the light from the person as an object to capture the light from the person as an object.

The light transmitted through the half mirror 17b is reflected by the reflecting surface 17c and thence sent to the imaging apparatus 17a which then is able to photograph the person as an object. An output of the imaging apparatus 17a is delivered to the image processing circuit of the main substrate 21 where it is digitally processed. The resulting digital signal is output to the first printer 18 or the second printer 19.

The first printer 18 is a printer usually employed, while the second printer 19 is an auxiliary printer used when the first printer 18 is out of order.

The image data, converted into the digital signal, is output to the first printer 18 or to the second printer 19 and printed on a photographic paper sheet on the first printer 18 or on the second printer 19. A power supply switch 20a or a cashbox 20b, for example, is enclosed in the back side section 12 forming the casing 11.

The sidewall sections 13, 14 are provided as one with and substantially parallel to the back side section 12. The sidewall sections 13, 14, as well as the outer wall section forming the back side section 12, is formed of a material with a higher specific gravity, such as iron plate, to render the lower part of the casing 11 heavy to enable the casing to be mounted in stability on a setting surface 2.

The sidewall section 13 is formed so as to be longer in length than the other sidewall section 14. The casing 11 is set so that the sidewall section, longer in length, will lie in contact with the wall surface.

A falldown inhibiting member 22, connected to the setting surface 2, is mounted to the sidewall section 13 as the short length side. The falldown inhibiting member 22 is screwed to the setting surface 2 and to the sidewall section 13 to prevent the falldown of the casing 11 even when the casing 11 is thrust from the sidewall section 13.

The other sidewall section 14 is set so as to be longer in length than the sidewall section 13 and hence is able to support the casing 11 sufficiently even when a force is applied from the side of the sidewall section 13.

The top plate 15, mounted between the sidewall sections 13, 14, forms the top plate of the imaging chamber 16, and is of a length approximately equal to or slightly longer than the other sidewall section 14. The top plate 15 is formed of a resin material, such as polypropylene.

That is, the top plate 15 is formed of a material lighter in specific gravity than the sidewall sections 13, 14. The casing 11 has its peripheral surface, inclusive of the sidewall sections 13, 14, formed of a material of a larger specific gravity, such as iron plates, and has the upwardly disposed top plate 15 formed of a material with a lighter specific gravity, so that the casing is heavier towards the lower side and hence may be set in stability on the setting surface 2.

The imaging chamber 16 is formed by the paired sidewall sections 13, 14, formed as one with the back side section 12, and by the top plate 15, and the spacing defined between the end of the sidewall section 13 and the end of the opposite side sidewall section 14 operates as an entrance 23 to the imaging chamber 16. The casing 11 is not provided with a bottom plate and hence the floor of the imaging chamber 16 is the setting surface, with the floor of the imaging chamber 16 being flush with the setting surface 2.

The details of the imaging chamber 16 will now be explained. A chair rotationally supported by the opposite side sidewall section 14 of the longer length is mounted to the imaging chamber 16. A side table 25 is provided adjacent to the chair 24 so that the person as an object may set e.g. his/her baggage thereon.

A first surface 16a, faced by the person, sitting on the chair 24, is arranged at right angles to the optical axis of the imaging apparatus 17a forming the imaging unit 17. At a location of this surface facing the face of the person as the object is mounted a substantially rectangular half-mirror 17b forming the imaging unit 17. With this half-mirror 17b, the person sitting on the chair 24 may proceed to have him/her photographed as he/she views his/her face with the half mirror 17b.

Second and third surfaces 16a, 16b, neighboring to the first surface 16b, carrying the half mirror 17b, are inclined with respect to the first surface 16a so that these second and third surfaces will face each other. These second and third surfaces 16a, 16b are provided with lighting instruments 26, 27, respectively, for lighting the person as an object. A lighting unit is enclosed within each of the lighting instruments 26, 27, and is lighted at the time of imaging to effect flash imaging.

Instead of illuminating the light from an upper front side of the object, as conventionally, the lighting instruments 26, 27 illuminate light from left and right sides of the person as an object to prevent the difference in illumination from occurring in a face area between the forehead and the jaw, that is, between upper and lower areas of the face of the person as the object as well as to prevent wrinkles from being shaded to render the wrinkles less outstanding.

Figure 6:
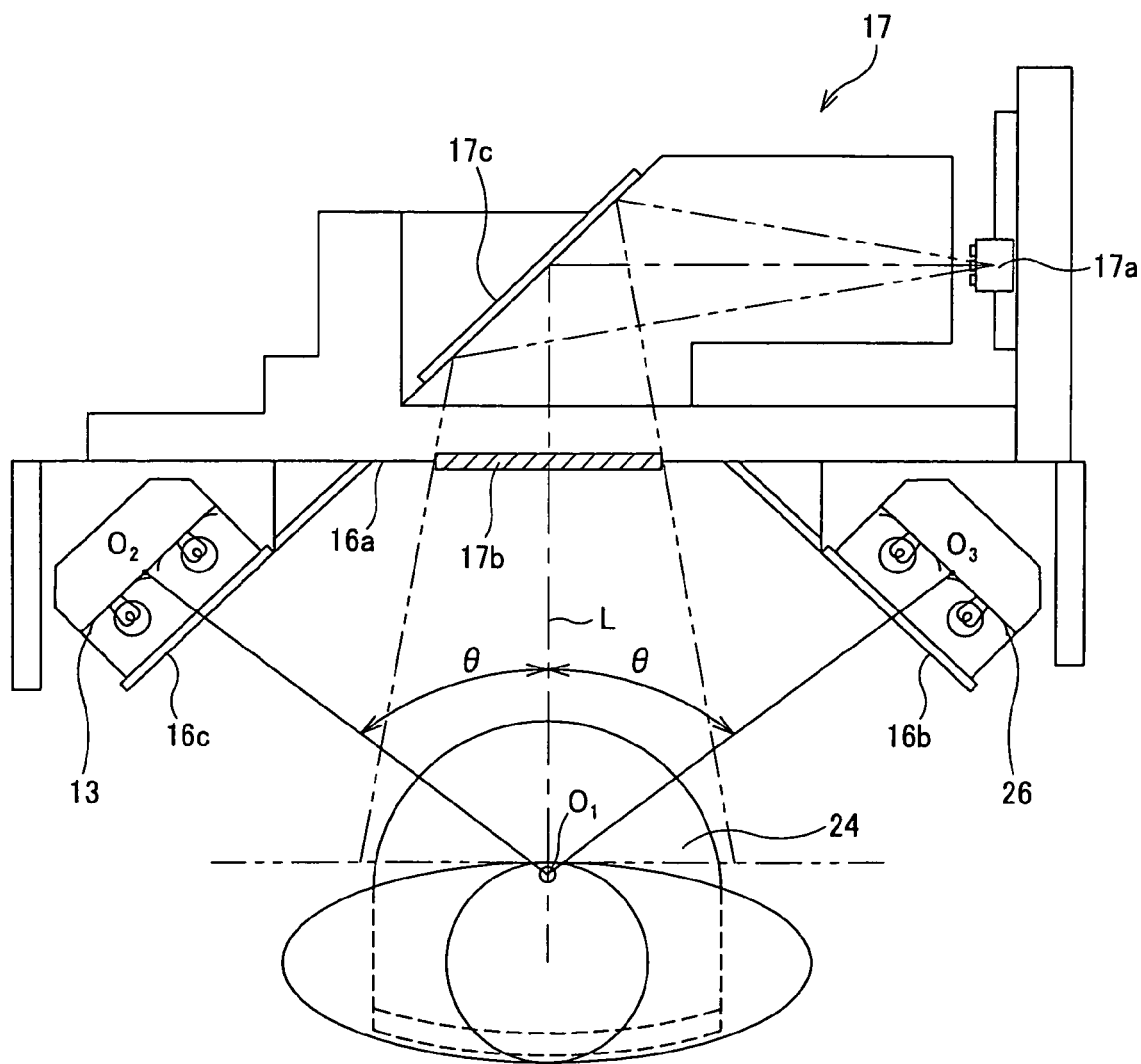
FIG. 6 is a plan view showing the state of use of paired left and right lighting instruments provided in an imaging chamber.

Meanwhile, the lighting instrument 26, provided to the second surface 16b, and the lighting instrument 27, provided to the third surface 16c, are provided so that the angle the optical axis L of the imaging apparatus 17a has with a line interconnecting the center O1 of a chair and the center O2 of the lighting instrument 26 and the angle the optical axis L of the imaging apparatus 17a has with a line interconnecting the center O1 of a chair and the center O3 of the lighting instrument 27 will both be equal to $\theta$, as shown in FIG. 6. This angle $\theta$ is set to such a value that a smooth shade is formed in the face at the time of imaging, no light is steadily illuminated on the spectacles and no shade is likely to be produced on the background. For example, the angle $\theta$ is set to for example 30° to 70°, preferably to to 50°.

Figure 7:
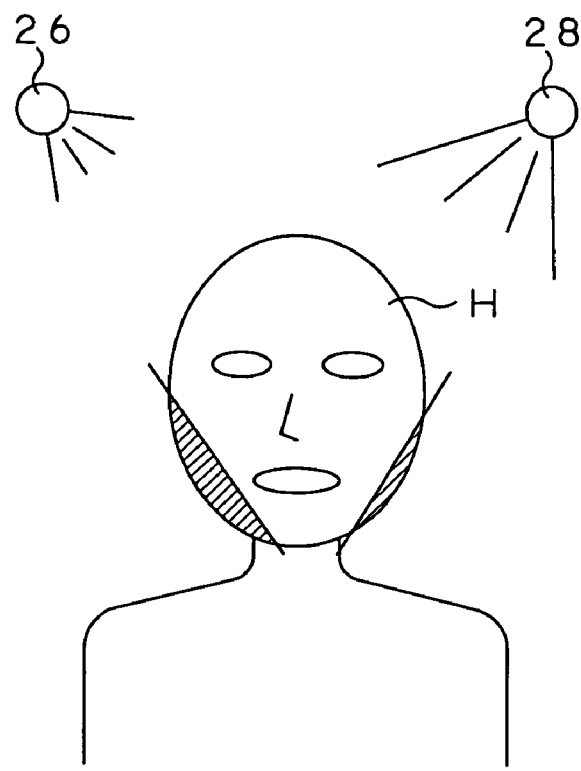
FIG. 7 is plan view showing the shade formed when a person is illuminated from paired left and right lighting instruments provided in an imaging chamber.
Figure 8:
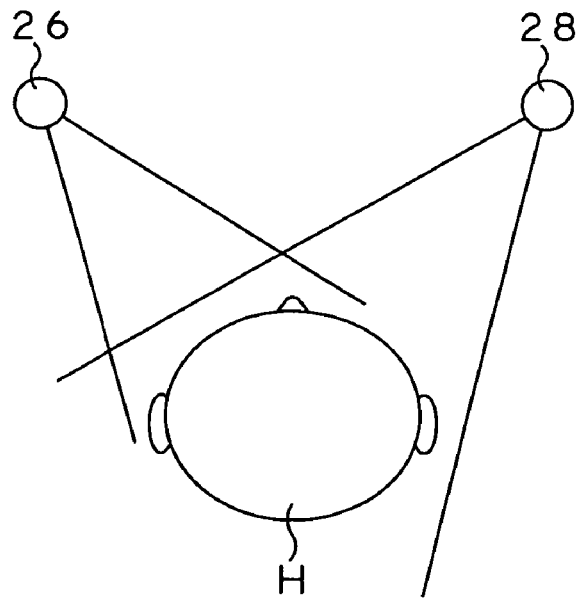
FIG. 8 is a top plan view showing the shade formed when a person is illuminated from paired left and right lighting instruments provided in an imaging chamber.

In general, the face captured on a photo gives a better impression to the viewer when there is a difference in illumination between left and right, as shown in FIGS. 7 and 8. Hence, the lighting instruments 26, 27 illuminate a person H as an object for generating the difference in illumination. For example, the lighting instruments 26, 27 illuminate the object so that the difference in illumination will be 1:1.5 to 1:3, preferably 1:2. Which of the lighting instruments is to emit more intense light is nonchalant. This produces a soft shade on the photo such that the object may be captured not two-dimensionally but three-dimensionally. The present imaging apparatus 1 employs a CCD as an imaging apparatus 17a of an imaging unit 17. The CCD has the latitude narrower than a camera employing a halide film (halide camera). Consequently, the above ratio of the difference in illumination in this case is set so as to be smaller than with the halide camera.

Moreover, the imaging chamber 16 includes, in addition to the lighting instruments 26, 27, a lighting instrument 28 for illuminating the object from a lower side. This lighting instrument 28 is provided to an upper surface section 28b of a protuberance 28a forming an extension of the first surface 16a on the lower side of the half mirror 17b and which is projected towards the inside of the imaging chamber 16. The lighting instrument 28 is provided so that its light illuminating direction is the obliquely upward direction.

In the imaging chamber 16, there is provided a fare box 29 towards the sidewall section 13 on the front side of the person as the object, as shown in FIGS. 3 to 5. The fare box 29, forming an operating unit, is made up by a coin depositing part 29a and a paper money depositing part 29b. These depositing parts 29a, 29b are provided at such a height that the person sitting on the chair may readily deposit the money with hand.

Although only the fare box 29 is provided as an operating unit in the present embodiment, there may also be provided an imaging start button for starting the imaging, and/or a check button for checking the image captured before printing on the first printer 18 or on the second printer 19. These buttons are also provided on the sidewall section on the front side of the person as the object.

On the lower side of the protuberance 28a is formed a positioning recess 31 for setting the imaging position of the person as the object. The position of the positioning recess 31 is at such a height that the knee part of the person sitting on the chair 24 can be accommodated in the recess 31. For imaging, the person as the object may sit on the chair 24 and has his/her knee engaged in the positioning recess 31 to set the imaging position extremely readily.

That is, the person as the object may face the half mirror 17b downright by having his/her knee engaged in the positioning recess 31.

The imaging chamber 16 is also provided with an object detection unit 32 for detecting whether or not the person as the object has entered its inside. The object detection unit 32 is provided on the chair 24 of the top plate 15 for detecting the person as the object is at the imaging position. On detection of the person as the object, the object detection unit 32 outputs a detection signal to a control circuit of the main substrate 21 to switch from a standby mode to a photographing mode.

Meanwhile, the object detection unit 32 may be provided in the above-mentioned positioning recess 31. When the object detection unit 32 is provided to the top plate 15, the person as the object is detected even when the person as the object in actuality is not at an imaging position, such as when he/she is standing in the imaging chamber 16. When the object detection unit 32 is provided within the positioning recess 31, the person as the object cannot be detected except if he/she has his/her knee engaged in the positioning recess 31, and hence the person as the object in the imaging position can be detected reliably.

In an area of the top plate 15, operating as an entrance 23, a curtain rail or a hook, not shown, is provided, for hanging a curtain 33 as a light shielding member thereon, for opening/closing the entrance 23.

Figure 9:
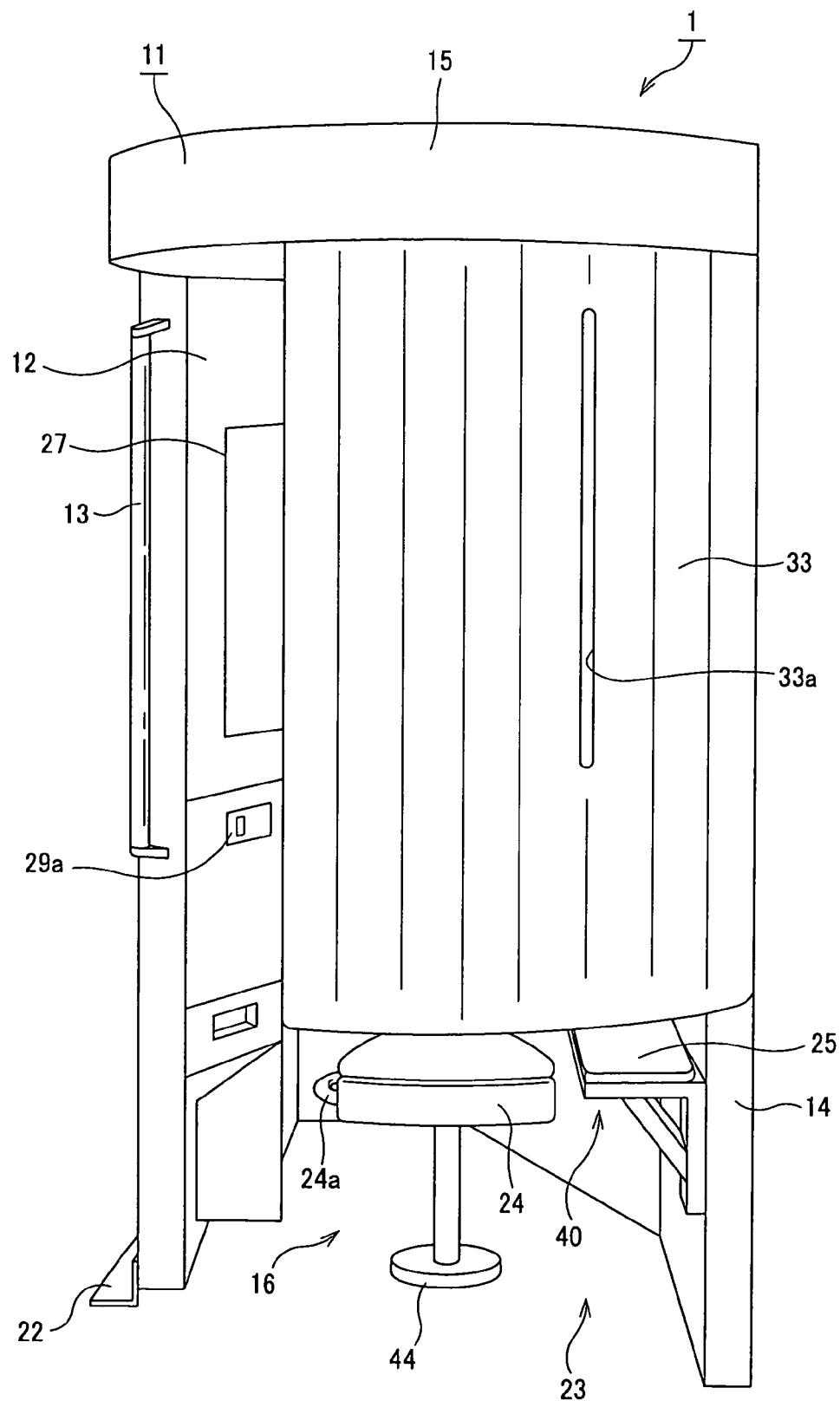
FIG. 9 is a front view of an imaging apparatus with a curtain closed.

This curtain 33 has a light shielding function and prevents the extraneous light from entering the imaging chamber 16 at the time of imaging. This curtain 33 may be moved readily, when one makes an entry into or exits from the imaging chamber 16, as shown in FIG. 9. In case the curtain 33 is fixed to a hook, entrance may be facilitated by providing a slit 33a in the curtain 33 on the front inlet side.

The surface of the curtain towards the imaging chamber 16, lying on the back side for the object, is an area of the background of the photo, and hence the slit 33a is formed in a portion of the area excluding the background of the photo.

A plate member, in place of the curtain 33, may be used as a light shielding member.

In a mid area of the end of the sidewall section 13 of the shorter length, forming the entrance 23, there is formed a first vertically extending grab rail 34, as an aid for a physically handicapped person to enter with ease into the imaging chamber 16.

In an upper area of the end of the sidewall section 14 of the longer length, forming the entrance 23, there is formed a vertically extending second grab rail 35, as an aid for a person walking on crutches to enter the imaging chamber 16 via entrance 23.

In a part of the sidewall section 14, at approximately the same height level as the fare box 29, forming the operating unit, there is provided a horizontally extending third hand rail 36 as an aid for the person sitting on the chair 24 to adjust the imaging position with ease.

In the sidewall section 13 of the shorter length, there is formed a photo exit port 38 through which exits a photo printed by the first pointer 18 or the second printer 19.

Figure 10:
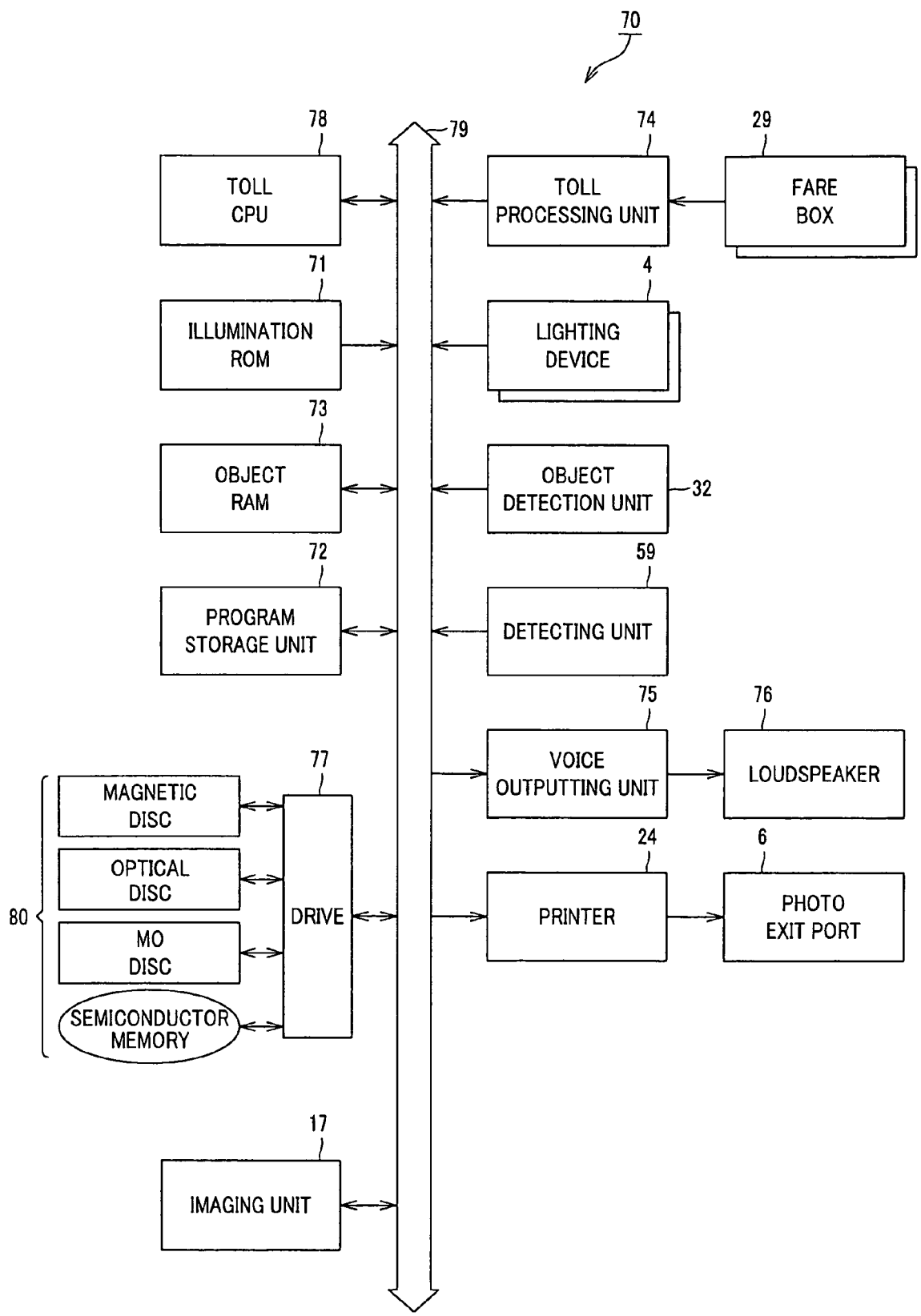
FIG. 10 is a block diagram showing an image processing apparatus according to the present invention.

Referring to FIG. 10, a control circuit 70, built into e.g. the main substrate 21, enclosed in the back side section 12, will now be explained. This control circuit 70 includes a ROM (read-only memory) 71, in which to store a program needed for operating the apparatus, a program storage unit 72, formed e.g. by a hard disc, in which to store an application program necessary for the operation of the apparatus, a program for performing image extraction, as later explained, a RAM (random access memory) 73, in which to load a program stored in the ROM 71 or in the program storage unit 72, a toll processing unit 74 for performing toll processing from the amount deposited in the fare box 29 to effect toll processing, a voice outputting unit 75 for outputting the voice, and a loudspeaker 76 for outputting the voice data as audible sound. The control circuit 70 also includes a drive 77 on which to load the external storage device and a CPU (central processing unit) 78 for controlling the overall operation. These component units are interconnected over a bus 79. To this bus 79 are connected the imaging device 17a, forming the imaging unit 17, lighting instruments 26, 27, 28, the object detection unit 32 for detecting whether or not the person as the object has entered the imaging chamber 16, and a detection unit 59 for detecting that the chair 24 is in the standby position.

On the drive 77 may be loaded a removable recording medium 80, such as a recordable write-once or rewritable optical disc, a magneto-optical disc or an IC card. In the removable recording medium 80, there may be stored image data of the person, as the object, the imaging unit 17 has photographed. These image data may not only be stored in the removable recording medium 80 but may also be transmitted to the above-mentioned other information processing apparatus connected to the network; such as LAN (Local Area Network).

The drive 77 may also be loaded with the removable recording medium 80, such as optical disc, so as to be used for installing the application program, needed for operating the apparatus 1, in the program storage unit 72. The programs installed on e.g. the program storage unit 72 may, of course, be downloaded and installed via the above-mentioned transmission/reception unit.

With the above-described imaging apparatus 1, a photograph may be produced by imaging the person as the object, automatically processing the image data of the person, obtained on photographing, by an image processing unit 100, and subsequently printing the data on a photographic paper sheet.

Moreover, with the imaging apparatus 1, light is illuminated from the lighting instruments 26, 27 on the person as the object, from the obliquely forward left and right directions, to prevent the difference in light illumination from being produced in an area between the forehead and the jaw, that is, between upper and lower parts, of the face of the person as the object. On the other hand, with the lighting instruments 26, 27, wrinkles may be shaded less easily. In addition, by providing the difference in illumination between the left and right illuminations, it is possible to cast a light shade on the photo to capture an object three-dimensionally.

B. Image Processing

The image processing apparatus, provided to the above-described imaging apparatus 1, will now be explained. The image processing apparatus, according to the present invention, is provided to the imaging apparatus 1, mounted in e.g. a hospital. The contour of the face of a person is detected from image data of the person output following the imaging (referred to below as image data of a person), and the contour of the face is corrected, based on the shape of the face classified, to output the so corrected image data of the person in question.

Figure 11:
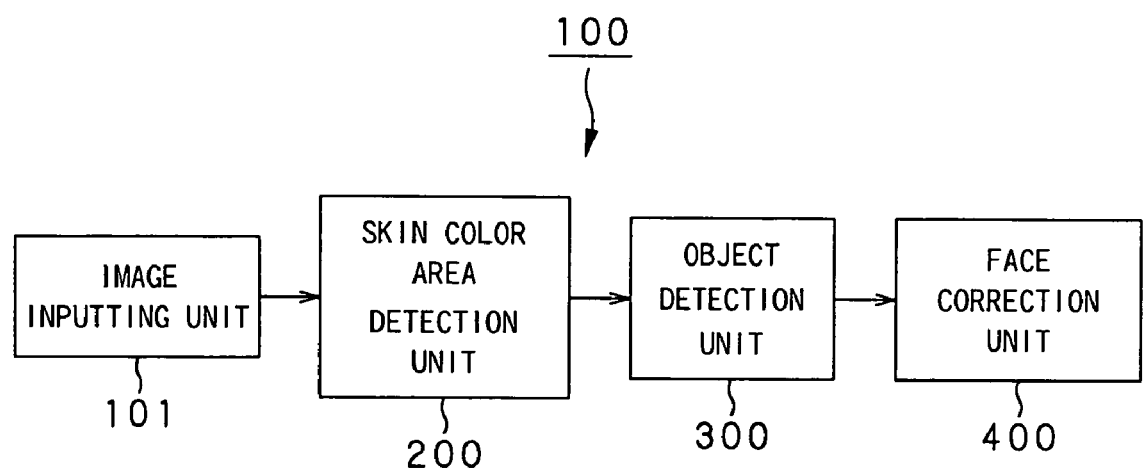
FIG. 11 is a block diagram showing an image processing apparatus according to the present invention.

Specifically, the image processing apparatus detects the contour of the face of a person, from input image data of the person, by a program stored in the program storage unit 72 in the above-described control circuit 70, to classify the face shape and, based on the so classified face shape, carries out the processing of contour correction. FIG. 11 depicts a block diagram showing the image processing apparatus of the present embodiment.

Referring to FIG. 11, the image processing unit 100 includes an image inputting unit 101, supplied with color image data of a person, output from the imaging unit 17, referred to below simply as color image data, and outputting the color image data as digital data, a skin color area detection unit 200 supplied with color image data to detect the skin color area, an object detection unit 300 for detecting the contour of the face of the object from the skin color area detected, an object detection unit 300 for detecting the contour of the face of the object from the detected skin color area and a face correction unit 400 for correcting the contour of the face of the object detected.

Figure 12:
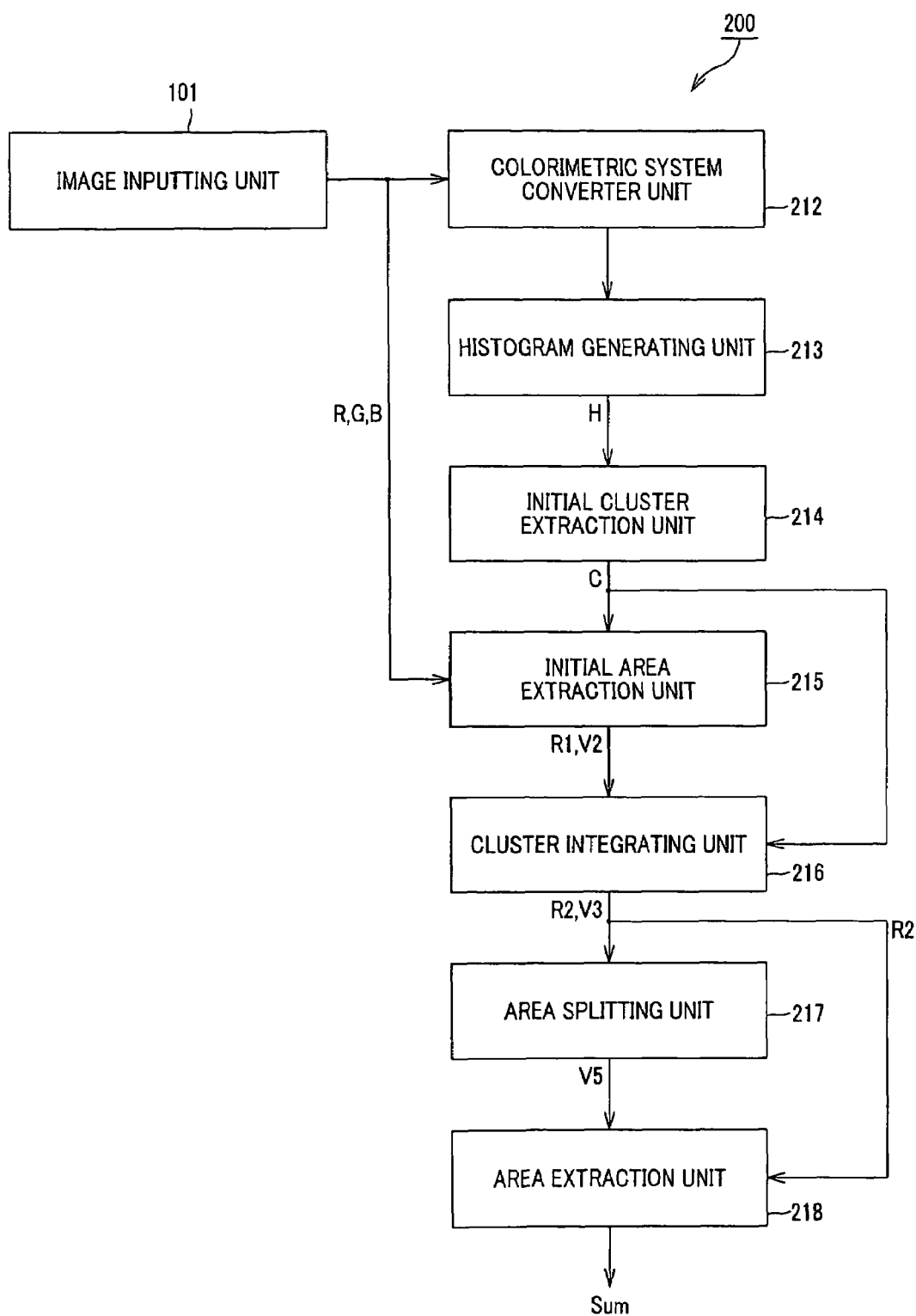
FIG. 12 is a block diagram showing a skin color area extracting portion in an image processing apparatus according to the present invention.

Referring to FIG. 12, the skin color area detection unit 200 is made up by a colorimetric system converter unit 212, a histogram generating unit 213, an initial cluster extraction unit 214, an initial area extraction unit 215, a cluster integrating unit 216, an area splitting unit 217 and an area extraction unit 218. The calorimetric system converter unit 212 is a color converter unit for converting pixel values of color image data entered from the image inputting unit 101 into coordinate values on the color space. The histogram generating unit 213 generates a histogram representing the frequency of occurrence of coordinate values as converted onto the color space. The initial cluster extraction unit 214 extracts the pixels at the locally maximum point of the frequency of occurrence in this histogram and its vicinity as initial clusters. The initial area extraction unit 215 extracts a closed domain including the initial clusters from color image data sent from the image input unit 101 ans the initial cluster extracted by the initial cluster extraction unit 214. The cluster integrating unit 216 integrates plural clusters into a sole cluster in case plural initial clusters have been extracted in this initial area. The area splitting unit 217 splits the initial area into plural areas, depending on the state of distribution of pixels in the initial area, while the area extraction unit 218 extracts the area having pixels belonging to the cluster corresponding to the skin color of the human being. The skin color area detection unit 200 sends the extracted skin color area to the object detection unit 300.

Figure 13:
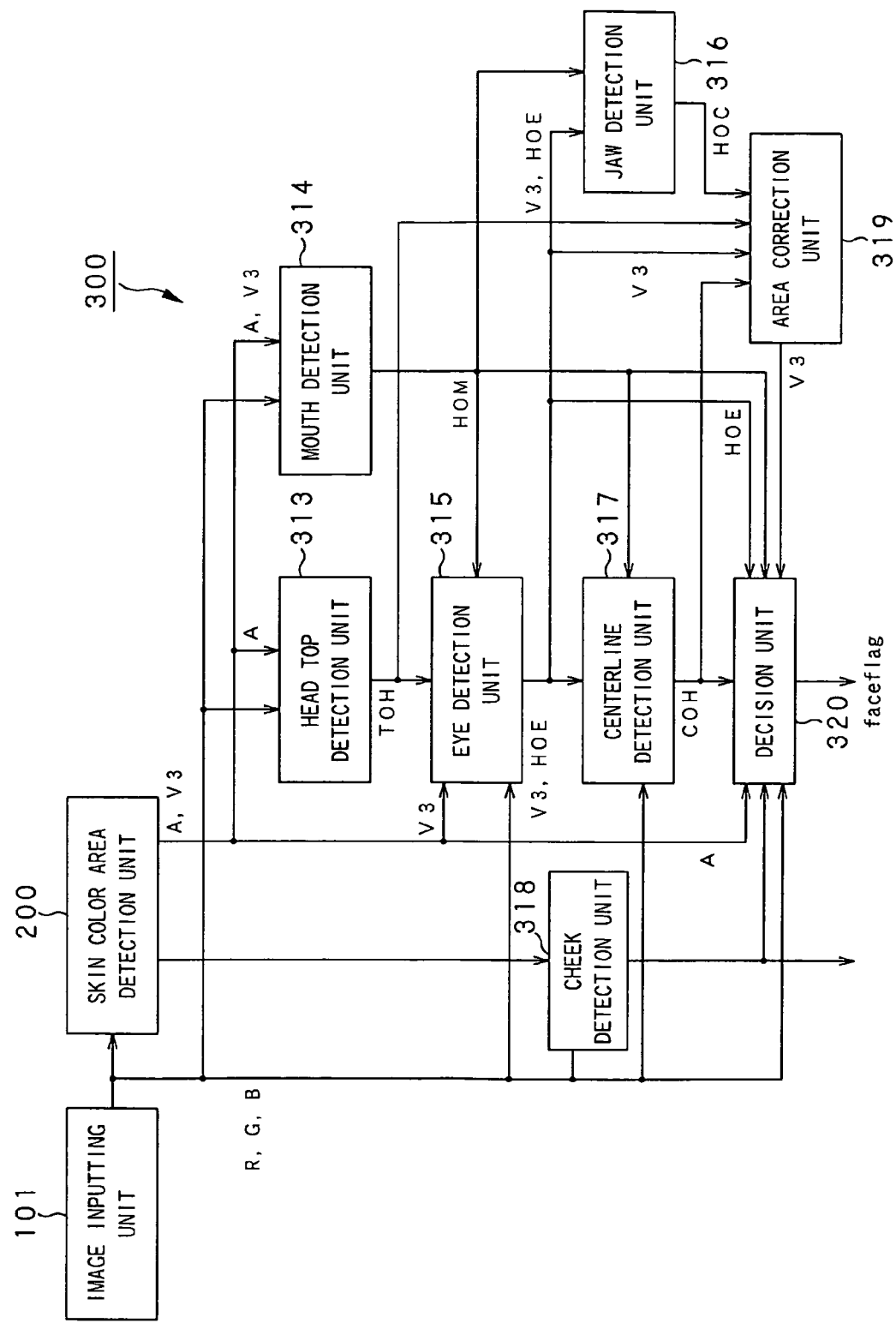
FIG. 13 is a block diagram showing an object detecting portion in an image processing apparatus according to the present invention.

Referring to FIG. 13, the object detection unit 300 includes a head top detection unit 313, a mouth detection unit 314, an eye detection unit 315, a jaw detection unit 316, a centerline detection unit 317, a cheek detection unit 318, an area correction unit 319, and a decision unit 320. The head top detection unit 313 is supplied with color image data and the skin color area from the image inputting unit 101 and the skin color area detection unit 200, respectively, to detect the position of the head top of a person. The mouth detection unit 314 is supplied with color image data and the skin color area to detect the position of the mouth of the person. The eye detection unit 315 is supplied with data of the color image data, skin color area, head top and the mouth to detect the position of the eye of the person. The jaw detection unit 316 is supplied with data of the eye and the mouth to detect the position of the jaw of the person. The centerline detection unit 317 is supplied with data of the color image data, mouth and the eye to detect the centerline of the face of the person. The cheek detection unit 318 is supplied with color image data to detect the cheek of the person. The area correction unit 319 is supplied with data of the head top, eyes, mouth and the face centerline to correct the face area, and the decision unit 320 is supplied with the color image data, akin color area, eye data, mouth data and correction data from the area correction unit 319 to verify whether or not the skin color area V as extracted is the face of the person. The data of the skin color area, head top, mouth, eyes, jaw, cheek and the face centerline, are supplied to the face correction unit 400 as the face contour information of the object.

Figure 14:
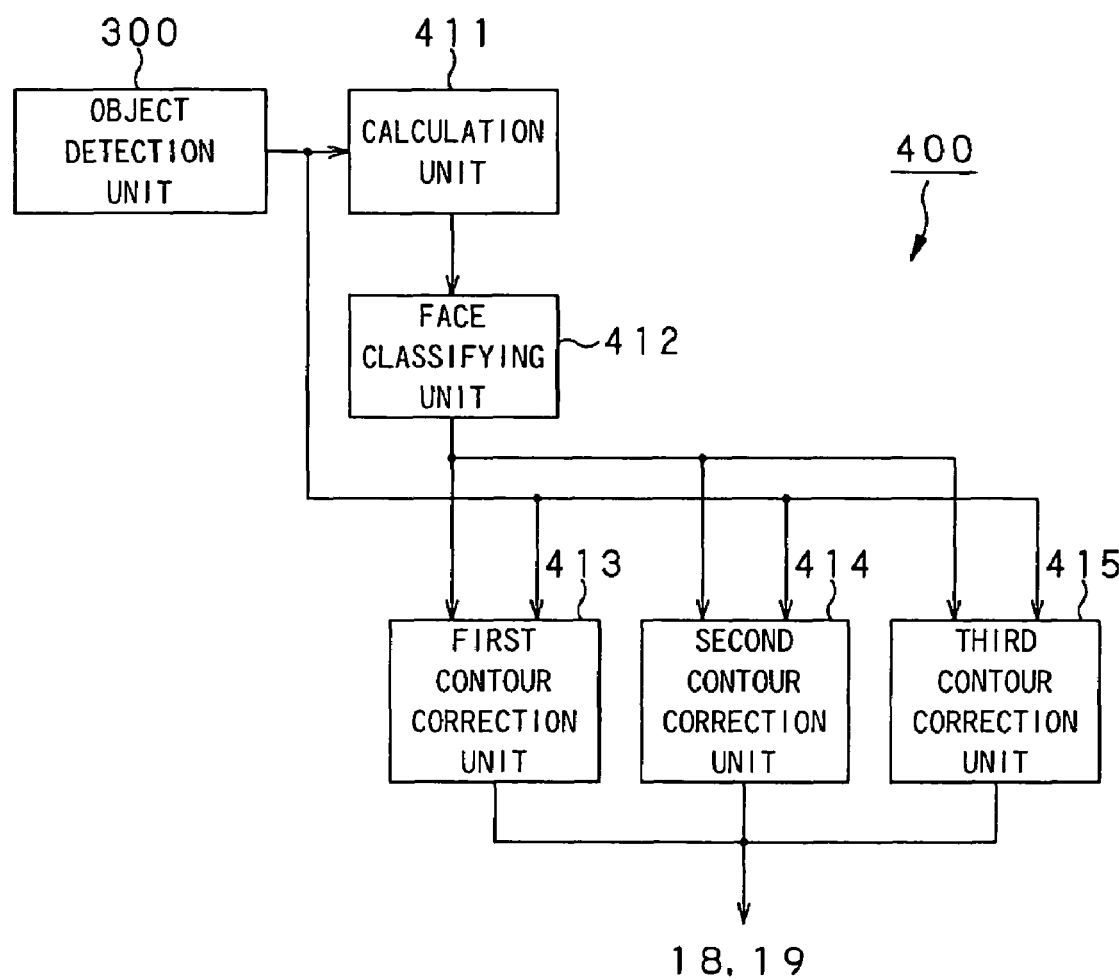
FIG. 14 is a block diagram showing a face correcting portion in an image processing apparatus according to the present invention.

Referring to FIG. 14, the face correction unit 400 includes a calculation unit 411, a face classifying unit 412, a first contour correction unit 413, a second contour correction unit 414, and a third contour correction unit 415. The calculation unit 411 is supplied with the contour information from the object detection unit 300 to calculate the face length and face width of the person, and the face classifying unit 412 classifies the face shape from the face length and face width of the person. The first to third contour correction units 413 are supplied with the contour information, face shape information and with color image data from the object detection unit 300, face classifying unit 412 and from the image inputting unit 101, respectively, to correct the contour of the face of the object. The face correction unit 400 corrects the contour based on the face shape to output color image data.

The respective parts of the image processing apparatus according to the present invention will now be explained in detail.

(1) Skin Color Area Extraction Unit

The skin color area detection unit 200 first converts the colorimetric system of the input color image data into coordinate values on the color space (color conversion process). The skin color area detection unit then generates a histogram representing the frequency of occurrence of coordinate values on the color space (histogram generating step).

The pixels at the locally maximum point of the frequency of occurrence in the histogram and in the vicinity thereof are extracted as initial clusters, and a cluster map C, representing the distribution of these initial clusters on the color space, is generated (initial cluster extracting step). In each of the initial clusters, the cluster number n, identifying each initial cluster, is set. An area map R then is formed by converting the initial clusters on the cluster map C again into coordinate values on the original color image data. The respective pixels on the area map R are provided with cluster numbers n along with the coordinate values.

Then, rectangular closed areas, in each of which the density distribution of the pixels belonging to the same initial clusters on this area map R, that is, the pixels having the same cluster number n, is higher than a predetermined threshold, are extracted as initial areas (initial area extraction step).

Then, two optional initial clusters are selected. If these two initial clusters belong to rectangular areas close to each other on the cluster map C and on the area map R, these two initial clusters are integrated (cluster integrating step). The area map R is updated, based on the cluster integrated from the initial clusters, and the rectangular areas are also again set, based on the updated area map.

The density distribution of the pixels having the same cluster number n in the so re-set rectangular area is calculated and the rectangular area is split as necessary, based on this density distribution (area splitting step). In this manner, plural rectangular areas, having the same color, are set in the input color image data. From these rectangular areas, the rectangular area having a specified color, herein the skin color, is extracted.

The respective steps will now be explained.

(1-1) Color Converting Step

In the color converting step, the color image data, obtained by the image inputting unit 101, are converted by the colorimetric converter unit 212 into the colorimetric system suited for extracting the desired area. For avoiding over-detection as much as possible, the as-converted calorimetric system in which the colors of the areas to be extracted will be distributed within a range as narrow as possible in the color space of the converted calorimetric system is to be selected.

There is known an r-g colorimetric system, shown by the following equations (1):

$$\begin{cases} r = \dfrac{R}{R+G+B} \\ g = \dfrac{G}{R+G+B} \end{cases} \quad (1)$$

as an effective calorimetric system, depending on the properties of the areas to be extracted, for example, in case the area of a face of a human being is a subject of extraction, as in the present embodiment. In the above equations, R, G and B denote coordinate values of the RGB colorimetric system. Thus, if the output image of the image inputting unit 101 is represented by the RGB colorimetric system, the colorimetric system converter unit 212 calculates the above equation (1), from pixel to pixel, to calculate the coordinate values (r, g). The data of the converted colorimetric system are sent to the histogram generating unit 213.

In the following explanation, the case in which this r-g calorimetric system is used for area extraction is taken as an example. In particular, the value of the position (coordinate) (x, y) on the input color image data are represented by $\{r(x,y), g(x,y)\}$.

(1-2) Histogram Generating Step

In the histogram generating step, a two-dimensional histogram, representing the frequency of occurrence on the color space of the data $\{r(x,y), g(x,y)\}$, having the colorimetric system converted by the colorimetric system converter unit 212, is generated by the histogram generating unit 213. The histogram is generated only for the range of colors containing a sufficient quantity of the area to be extracted. This color range may be represented by the following equations (2):

$$\begin{cases} r\min \le r \le r\max \\ g\min \le g \le g\max \end{cases} \quad (2)$$

by setting lower and upper values for r and g. In the above equations (2), rmin and rmax denote the lower and upper values of r, respectively, whilst gmin and gmax denote the lower and upper values of g, respectively.

In case $\{r(x,y), g(x,y)\}$ in the positions (x, y) on an image satisfy the conditions of the above equations (2), these values are first quantized in accordance with the following equations (3):

$$\begin{cases} ir = int\left(\dfrac{r - r\min}{rstep} + 0.5\right) \\ ig = int\left(\dfrac{g - g\min}{gstep} + 0.5\right) \end{cases} \quad (3)$$

and converted into coordinates (ir, ig) on the histogram. In the above equations, rstep and gstep denote quantization steps for r and g, respectively, and int denotes calculations for truncating the subdecimal portions of the numerical values within the parentheses.

The two-dimensional histogram H, indicating the frequency of occurrence of the coordinate values, can be generated by incrementing the histogram values corresponding to the calculated coordinate values in accordance with the following equation (4):

$$H(ir(x,y),ig(x,y))=H(ir(x,y),ig(x,y))+1 \qquad (4)$$

Figure 15:
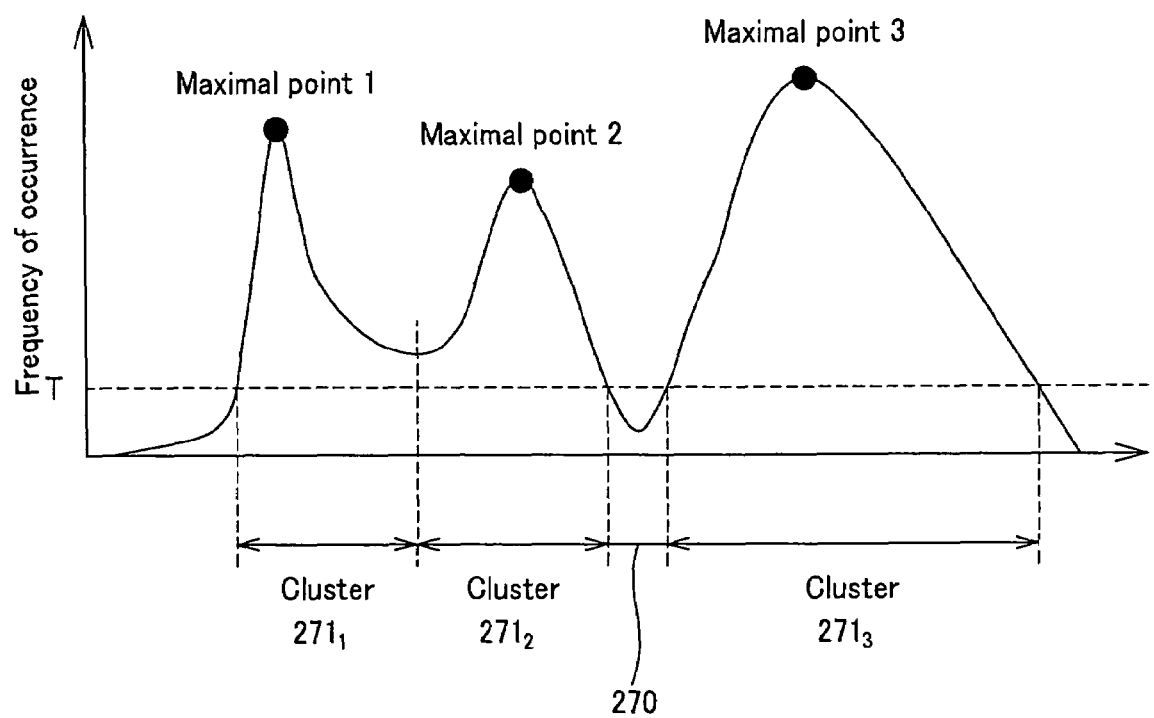
FIG. 15 is a graph showing the relationship between the histogram indicating the frequency of occurrence and clusters, with the coordinate and the frequency of occurrence being taken on the abscissa and on the ordinate, respectively.

FIG. 15 schematically shows, for simplicity, the relationship between the one-dimensional histogram, rendered from the inherently two-dimensional histogram, and the extracted initial clusters. Referring to FIG. 15, the frequency of occurrence shows plural locally maximal points differing in magnitudes depending on the size of the color areas, such as skin color areas, on the color image data.

The histogram generated is smoothed by a low-pass filter, as necessary, for removing e.g. the noise and for preventing errors in detection, and subsequently sent to the initial cluster extraction unit 214.

(1-3) Initial Cluster Generating Step

In the initial cluster generating step, the initial cluster extraction unit 214 extracts a set of coordinates of colors with concentrated distribution, as initial cluster, from the two-dimensional histogram generated by a histogram generating unit 213 as indicating the frequency of occurrence of the respective coordinate values. Specifically, a set of pixels lying at the local maximal point of the frequency of occurrence in the coordinate values of the above-described r-g colorimetric system and in the vicinity thereof are extracted as an initial cluster.

That is, each maximal point is deemed to be an initial cluster, made up of a sole constituent element, and neighboring coordinates about this inchoate point, are merged to cause the initial cluster to grow in size. This is made possible by scanning the coordinates on a cluster map C, already generated, and by detecting coordinates to be merged anew.

For example, in the case of FIG. 15, sets of pixels of coordinates in the vicinity of the locally maximal points 1 to 3, as inchoate points, and the sets of the so merged pixels, are extracted as initial clusters 2711 to 2713, respectively.

With the locally maximal value, with the frequency of occurrence H(ir, ig) in the histogram of FIG. 15, as inchoate point, the pixel of the coordinate neighboring to this inchoate point, up to the pixel of the coordinate value, the frequency of occurrence H (ir, ig) of which is about to reach the threshold value T (the coordinate prior to becoming equal to or less than the threshold value T), are sequentially merged. It may be an occurrence that the coordinate (ir, ig) is not merged in any cluster and has the frequency of occurrence larger than the threshold value T and any of the neighboring coordinates (ir+dr, ig+dg) has already been merged in some or other initial cluster, with the frequency of occurrence of the neighboring coordinate being higher than the own frequency of occurrence. In such case, the coordinate (ir, ig) is detected as being the coordinate to be merged in the same initial cluster as that of the neighboring coordinate already merged.

Thus, the extraction of pixels having coordinates in a coordinate area with lower frequency of occurrence is forestalled by providing the threshold value T of the frequency of occurrence. It is noted that one or more initial clusters are extracted, depending on the number of the locally maximal points of the two-dimensional histogram H, and that an inherent number is allocated to each initial cluster for identification. The plural initial clusters, thus extracted, are indicated as multi-valued images on the cluster map C (ir, ig), as a two-dimensional array, in accordance with the following equation (5):

$$C(ir,ig)=n \qquad (5)$$

Figure 16:
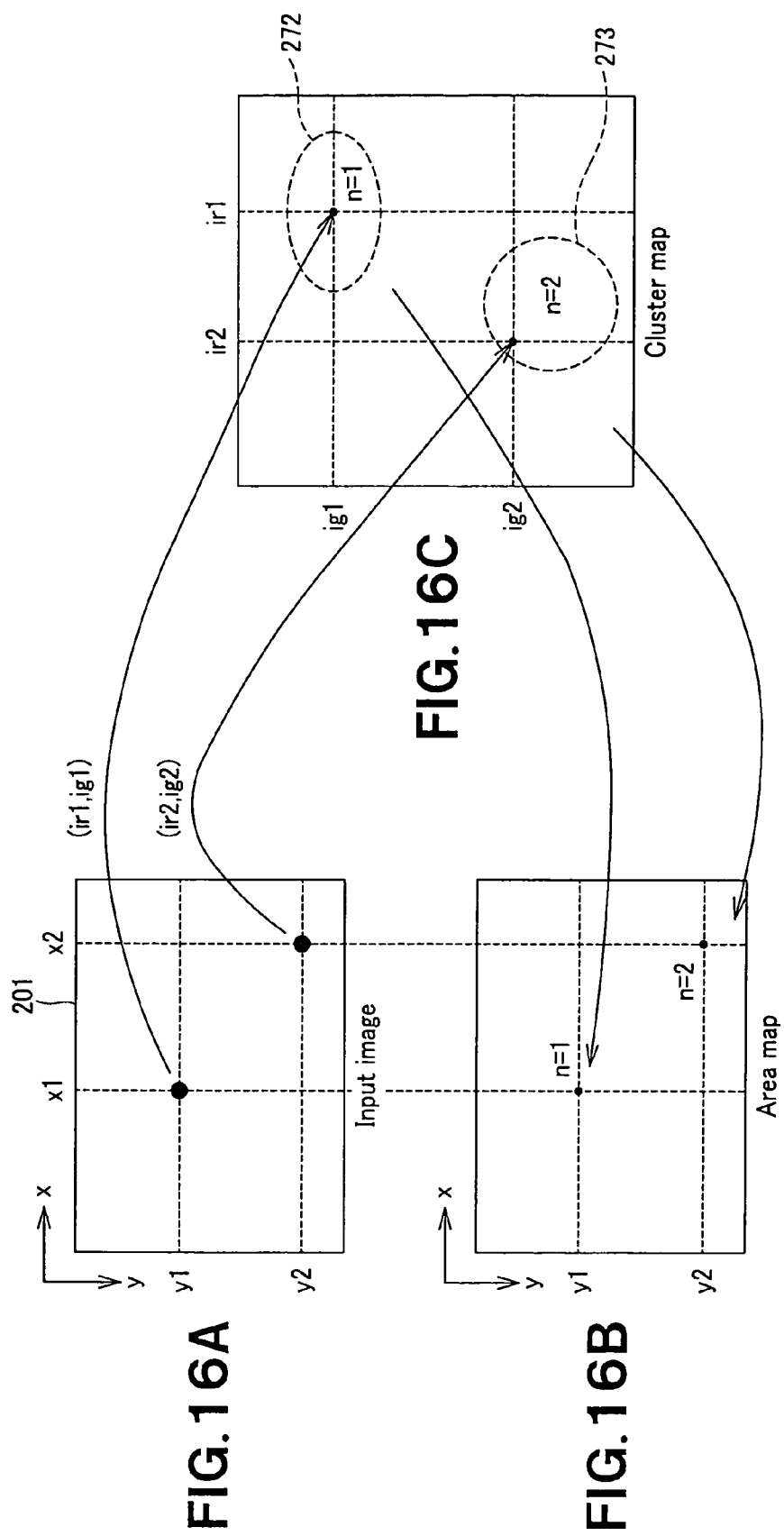
FIGS. 16A to 16C are schematic views showing an input image, a cluster map V and an area map R, respectively.

This equation (5) indicates that the color coordinate (ir, ig) is included in the initial cluster n. FIGS. 16A and 16B are schematic views showing an input image and a cluster map, respectively. Referring to FIG. 16A, the pixel values of e.g. (x1, y1) or (x2, y2) in an input color image data 201 is converted by the calorimetric system converter unit 212 into color coordinates (ir1, ig1), (ir2, ig2) and, from the frequency of occurrence thereof, a two-dimensional histogram is generated. The initial clusters, extracted on the basis of the two-dimensional histogram, are indicated as initial clusters 272, 273 on the cluster map C as a two-dimensional array shown in FIG. 16B, where ir and ig are plotted on the abscissa and on the ordinate, respectively. The so extracted initial clusters are sent as the cluster map C shown in FIG. 16B to the initial area extraction unit 215 and to the cluster integrating unit 216.

(1-4) Initial Area Extraction Step

In the initial area extraction unit 215, the rectangular area, where the pixels belonging to the same initial cluster, out of the pixels of colors included in the initial clusters, such as initial clusters 272, 273, obtained by the initial cluster extraction unit 214, shown for example in FIG. 16B, are concentrated on color image data, is extracted as an initial area. FIG. 16C schematically shows an area map R. The pixels extracted from the initial clusters, generated on growth by the initial cluster extraction unit 214, are represented as multi-valued image, having a cluster-identifying symbol n, on the area map R(x, y), which is a two-dimensional map R(x, y) shown in FIG. 16C.

It is noted that the pixels lying at the positions (x1, y1) and (x2, y2) of the input color image data shown in FIG. 16A are included in the initial clusters 272, 273, shown for example in FIG. 16B, and that, if the cluster numbers n of the initial clusters 272, 273 are 1 and 2, respectively, the coordinates (x1, y1) and (x2, y2) in the area map R are of the cluster numbers 1 and 2, respectively. That is, when the color of the pixel at (x, y) on an image is included in the cluster n, the following equation (6):

$$R(x,y)=n \qquad (6)$$

holds.

Figure 17:
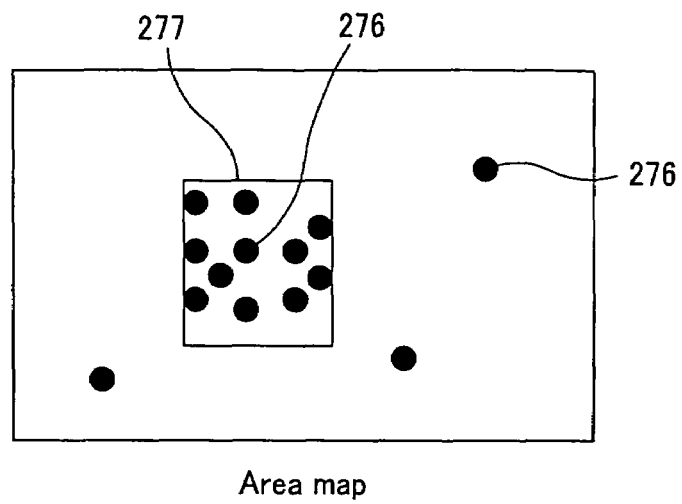
FIG. 17 is a schematic view showing an area map R prepared in the skin color area extracting portion in an image processing apparatus according to the present invention.
Figure 18:
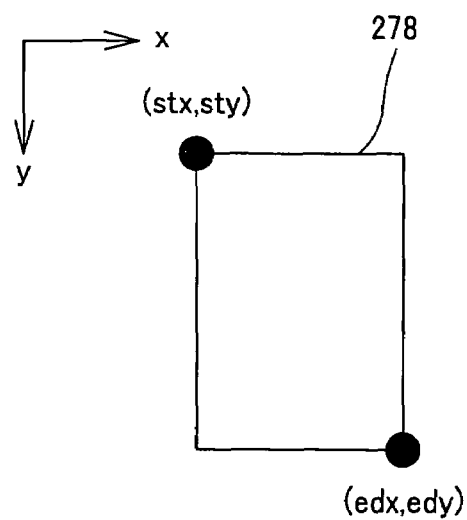
FIG. 18 is a schematic view showing a rectangular area extracted in a skin color area extracting unit.

In the area map R shown in FIG. 17, a rectangular area 277, surrounding an area of concentrated distribution of the extracted pixels 276, is then calculated. The rectangular area, obtained in association with each initial cluster, is represented by coordinates of two apex points (srx, sty), (edx, edy) of a single diagonal line, as shown in FIG. 18, and is stored in an apex point list V1 as a one-dimensional array. That is, if the coordinates of two apex points of the rectangular area 277, obtained in association with the cluster n, are (stx, sty), (edx, edy), these coordinates are stored in the coordinate of the apex point V1(n), in accordance with the following equations (7):

$$\begin{cases} V(n).stx = stx \\ V(n).sty = sty \\ V(n).edx = edx \\ V(n).edy = edy \end{cases} \quad [\text{II}](7)$$

The extracted pixels, obtained in accordance with the respective initial clusters, and the rectangular areas 277, are sent as area maps Rand as the lists of apex points V1, to the cluster integrating unit 216, respectively.

(1-5) Cluster Integrating Step

In the cluster integrating step, plural initial clusters for colors inherently included in a sole area but extracted as different initial clusters, are integrated by the cluster integrating unit 216, using the cluster map C obtained by the initial cluster extraction unit 214, the area map R obtained by the initial area extraction unit 215 and the list of the apex points V1, obtained by the initial area extraction unit 215.

That is, when supplied with the cluster map C, generated in the initial cluster extraction unit 214, the cluster integrating unit 216 first generates the combination of two optional initial clusters m, n. From the so generated initial clusters m, n and the cluster map C, the color difference between the initial clusters m and n is calculated. From the initial clusters m, n, area map R, list of the apex points V1, color difference and from the overlap degree, it is verified whether or not the initial clusters m, n are to be integrated. The clusters are integrated when the color difference is small, and the initial clusters m, n are distributed with marked overlap on the image.

Responsive to the integration of the initial clusters, the area map R and the list of the apex points V1 are corrected and sent to the area splitting unit 217 as the area map R2 and as the list of apex points V2, respectively. The corrected area map R2 is also sent to the area extraction unit 218.

(1-6) Area Splitting Step

In the area splitting step, the rectangular area, indicated by the coordinates of the apex points V2(n), stored in the list of the apex points V2, is split by the area splitting unit 217, using the area map R2 and the list of apex points V2, as corrected in the cluster integrating unit 216, in dependence upon the distribution of the pixels extracted by the same cluster, that is, the initial cluster or the integrated cluster resulting from integration of plural initial clusters, referred to below simply as the cluster. That is, when the new area map R2 and the list of apex points V2(n), obtained by the cluster integrating unit 216, are entered by the cluster integrating unit 216, main splitting points, horizontally or vertically splitting the rectangular area, indicated by the list of apex points V2(n) in two, are detected. In case the rectangular area is vertically split into two, each vertically split rectangular area is split horizontally, using the area map R2 and the list of apex points of the two vertically split rectangular areas.

In case the rectangular area is horizontally split into two, each horizontally split rectangular area is split vertically, using the area map R2 and the two horizontally split rectangular areas. In splitting an area, a histogram HH and a histogram HV, obtained on accumulating the number of pixels, extracted by the cluster n, in the horizontal and vertical directions, in the rectangular area represented e.g. by the list of apex points V2 and points corresponding to the smallest points of the histograms, are detected. The area is split in case the so detected point is smaller than a preset threshold value.

The rectangular area then is corrected, using the area map R2 and the list of apex points of the rectangular area, thus split.

Figure 19:
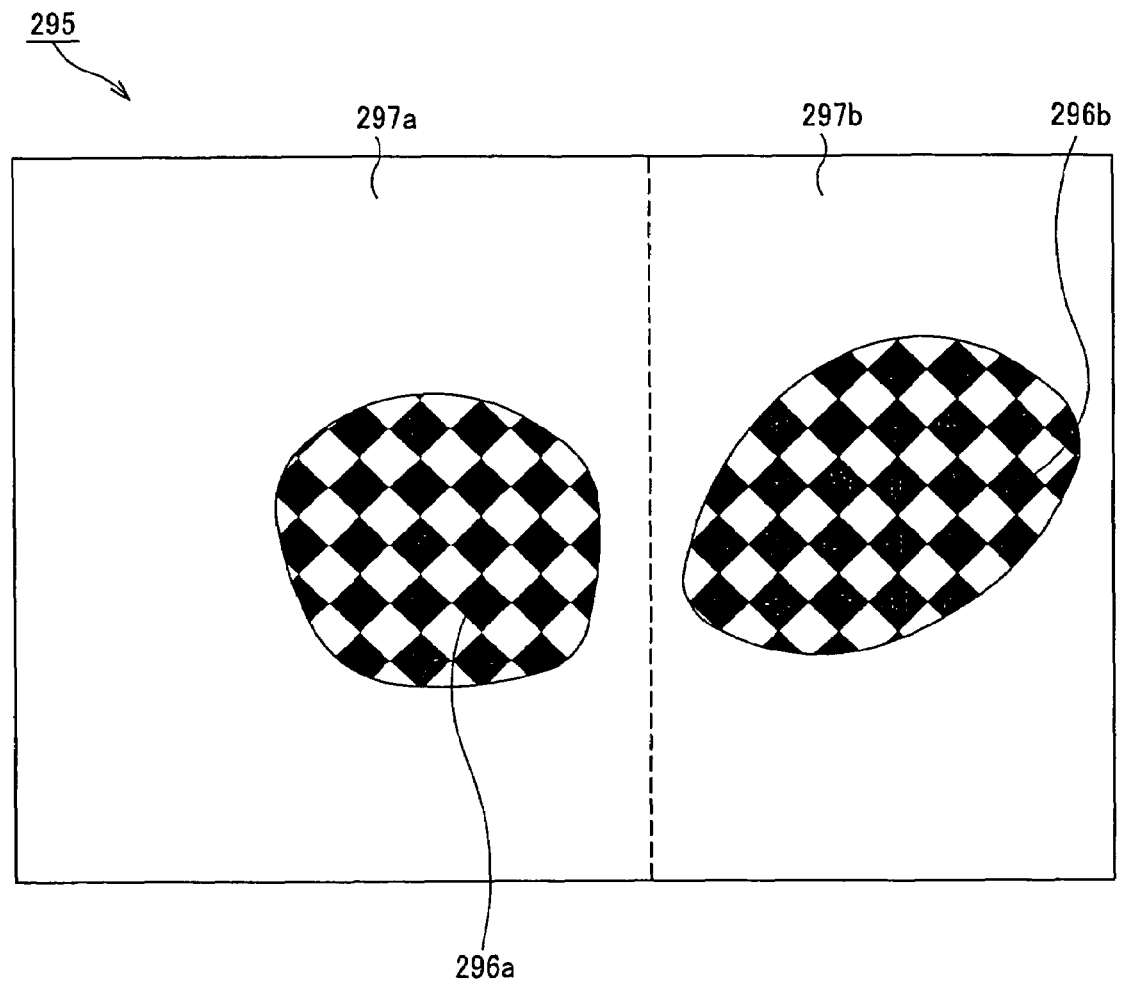
FIG. 19 is a schematic view showing a rectangular area to be split in the area splitting portion.

For example, if pixels extracted by the same cluster on an image form plural blocks 296a, 296b in the rectangular area 295 obtained in association with the cluster, as shown in FIG. 19, the rectangular area 295 is split, as these blocks 296a, 296b are deemed to be different blocks. The result is that plural pixel blocks, such as blocks 296a, 296b, are present in the rectangular area 295, such that it is possible to calculate split rectangular areas 297a, 297b surrounding the respective pixel blocks 296a, 296b.

As the initial area extraction unit 215, the as-split rectangular areas 297a, 297b are represented by the coordinates of two diagonally opposite apex points, and are stored in a new list of apex points V3(n, m). That is, if the m'th rectangular area corresponding to the cluster n is represented by {(V3(n, m).stx, V3(n, m).sty}, {(V3(n, m).edx, V3(n, m)edy}, these coordinates are stored in the new list of the apex points V3(n,m) as indicated by the following equation (8):

$$\begin{cases} V3(n, m).stx = stx \\ V3(n, m).sty = sty \\ V3(n, m).edx = edx \\ V3(n, m).edy = edy \end{cases} \quad [\text{II}](8)$$

The new list of apex points V3(n, m) is sent to the area extraction unit 218.

(1-7) Area Extraction Step

The area extraction unit 218 extracts, using the area map R2, as corrected by the cluster integrating unit 216, and the new list of apex points V3, obtained by the area splitting unit 217, a set Snm of pixels satisfying the condition of the following equation (9):

$$\text{Sum} = \begin{cases} (x, y) \mid R2(x, y) = n, V3(n, m) \cdot stx \le x \le V3(n, m) \cdot edx, \\ V3(n, m) \cdot sty \le y \le V3(n, m) \cdot edy \end{cases} \quad [\text{II}](9)$$

That is, even in case pixels are extracted from the same cluster, but the rectangular area is split by the area splitting unit 217, the pixels are extracted as the split rectangular areas, such as the rectangular areas 297a, 297b, shown in FIG. 19, are deemed to be a single set of pixels. The plural areas, thus extracted, are sent to a decision unit for giving a decision as to if the area in question is a desired one.

Thus, in the skin color area detection unit 200, in case an area for an object is composed of plural analogous colors, these colors may be integrated and handled as a sole area, by the cluster integrating unit 216, whereas, if there exist plural objects with the same color, these objects may be handled separately from one another, by the area splitting unit 217. Moreover, by extracting or integrating the clusters, or by splitting the extracted area by pixel density distribution, the skin color area may be extracted extremely accurately.

(2) Object Detection Unit

The object detection unit 300 assumes each skin color area, as extracted by the skin color area detection unit 200, as being a face area. From the rectangular area, represented by the coordinates of the apex points V3(n), corresponding to the skin color area, a feature point detection unit detects respective feature points. The feature point detection unit is made up by a head top detection unit 313, a mouth detection unit 314, an eye detection unit 315, a jaw detection unit 316, a centerline detection unit 317, a cheek detection unit 318, an area correction unit 319, and a decision unit 320. The head top detection unit 313 detects the position of the head top of a person. The mouth detection unit 314 detects the position of the mouth of the person based on redness in the skin color area. The eye detection unit 315 detects the position of the eye of the person by setting a range of retrieval based on the position of the mouth and the head top. The jaw detection unit 316 calculates the position of the jaw of the person based on the position of the eyes and the mouth. The centerline detection unit 317 sets the mouth area from the mouth position to detect the centerline of the face based on the strength of redness of the mouth area. The cheek detection unit 318 detects the cheek line from the boundary line of transition from the skin color to other colors in the skin color area based on the positions of the head top, eyes and the mouth. The area correction unit 319 corrects the coordinate of the apex point V3(n), calculated in the skin color area detection unit 200, from the head top, jaw and the face centerline, and the decision unit 320 verifies whether or not the skin color area V as extracted is the face of the person.

These detection units will now be explained in further detail.

(2-1) Detection of the Head Top of a Person

The head top detection unit 313 detects the head top of a person having the skin color area as the face.

In detecting the head top, it is assumed that the background area other than the person is of a mono-color, and that only the background area may exist in the area above the person, that is, on the smaller vertical axis side of the image, and the smallest vertical coordinate position among the pixels having the color different from the background color is detected. In the following, the coordinate along the vertical direction at the head top position is termed the height of the head top.

Figure 20:
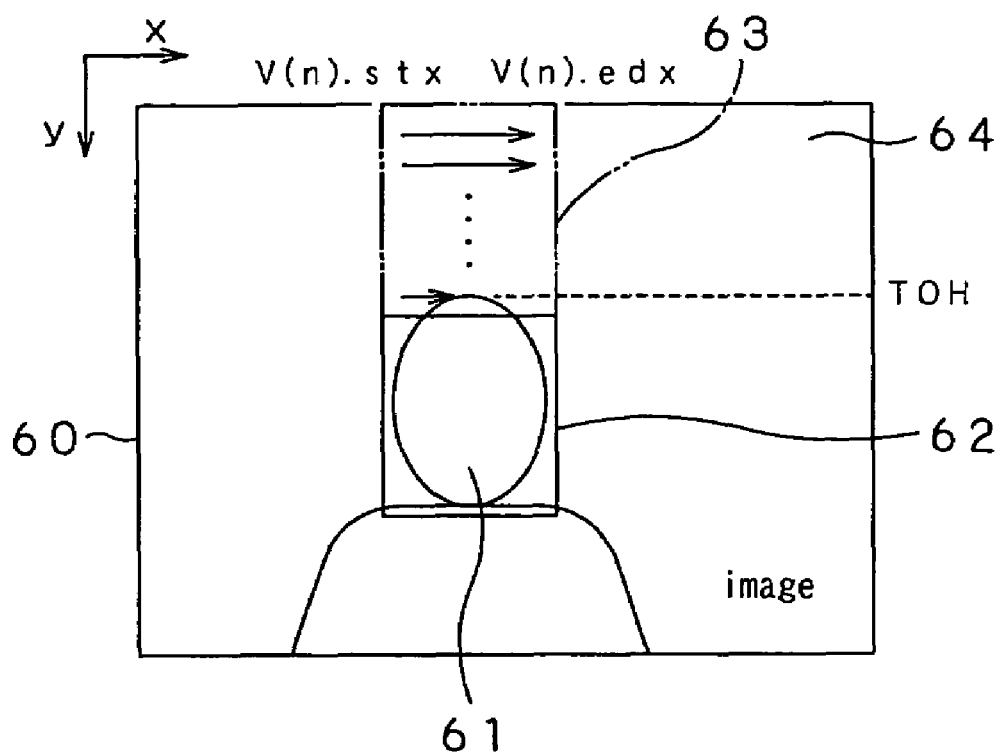
FIG. 20 is a schematic view showing a retrieving area when retrieving a head top site of a person in a color image.

Specifically, referring to FIG. 20, a head top search area 363 set in an upper part of the rectangular area 36 corresponding to a skin color area 361 of interest, that is, an area with a smaller vertical coordinate value than a rectangular area 362, with V3(n,m).stx ▯horizontal coordinate (x-coordinate)▯ V3(n).edx, is scanned from an upper part in the drawing to calculate the difference d between the values of the respective pixels and the background color of the background area 364 in accordance with the following equation (10):

$$d = \sqrt{(R(x,y) - Rbg)^2 + (G(x,y) - Gbg)^2 + (B(x,y) - Bdg)^2} \quad (10)$$

where R(x,y), G(x,y) and B(x,y) are R, G and B values of the pixels on the coordinate (x,y) on the color image data, while Rbg, Gbg and Bbg are values of R, G and B of the background color. As the background color, an average value of pixels in an image area above the current pixel of interest, that is, an average value of pixels in an area of smaller vertical coordinate (y-coordinate) value, for example an average value of up to the tenth line from an uppermost end 360a of the color image data 360, may be used.

The color difference d of the above equation is then calculated and, at a time point when there has appeared a pixel for which the above value is larger than the preset threshold value T, the vertical coordinate y is retained to be the height TOH of the head top. The height TOH of the head top, thus detected, is sent to the eye detection unit 315, cheek detection unit 318 and the area correction unit 319.

(2-2) Detection of a Mouth of the Person

The mouth detection unit 314 then detects the height of the mouth with respect to the respective skin color areas as extracted by the skin color area detection unit 200. First, in a rectangular area, represented by the list of apex points V3(n), the value rdsh (x,y) of the following equation (11):

$$rdsh(x,y) = \begin{cases} \dfrac{R(x,y) \times B(x,y)}{G^2(x,y)} \ldots G(x,y) \geq B(x,y) \\ \dfrac{R(x,y) \times G(x,y)}{B^2(x,y)} \ldots G(x,y) < B(x,y) \end{cases} \quad (11)$$

representing the strength of redness, is calculated for each pixel (x,y) not extracted as the skin color area.

Figure 21:
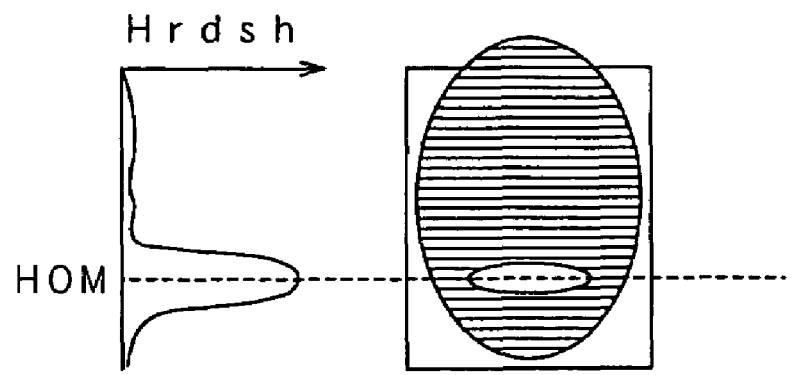
FIG. 21 is a schematic view showing the relationship between the histogram Hrdsh generated on accumulating red intensities in the horizontal direction of a rectangular area and the rectangular area.

The calculated value rdsh (x,y) is accumulated in the horizontal direction (x-axis direction), as shown in FIG. 21, to generate the histogram Hrdsh shown by the following equation (12):

$$Hrsdh(y) = \sum_{\substack{V3(n).stx \leq x \leq V3(n).edx \\ etopu \leq y \leq ebtm}} edge(x,y) \quad (12)$$

where V3(n) and R(x,y) are both data sent from the skin color area detection unit 200 and denote an apex point coordinate and an area map of the rectangular area corresponding to the skin color area n, respectively.

The histogram Hrdsh(y) is then smoothed by a one-dimensional low-pass filter for noise removal and the vertical coordinate y at the maximum value of the histogram Hrdsh is found as the height of the mouth HOM. The height of the mouth HOM, thus detected, is sent to the eye detection unit 315, jaw detection unit 316, centerline detection unit 317, cheek detection unit 318 and to the decision unit 320.

(2-3) Detection of an Eye of a Person

The eye detection unit 315 then detects the height of the eye with respect to each of the skin color area extracted by the skin color area detection unit 200. First, from the head top height TOH, as detected by the head top detection unit 313, and the height of the mouth HOM, as detected by the mouth detection unit 314, the search range of the eye in the vertical direction (y-axis direction) is calculated by e.g. the following equations (13):

$$\begin{cases} etop = (HOM - TOH) \times e1 + TOH \\ ebtm = (HOM - TOH) \times e2 + TOH \end{cases} \quad (13)$$

但し、

$e1 < e2$ $0.0 < e1, e2 < 1.0$

In the above equations, e1 and e2 are preset coefficients and etop, ebtm are lower and upper values in the vertical coordinate of the search range, respectively. The strength edge (x,y) of the edges in the horizontal direction, referred to below as horizontal edges, sandwiched between lower and upper limit values in these vertical coordinates and lying in a rectangular area corresponding to the skin color area of interest, is calculated.

Figure 22:
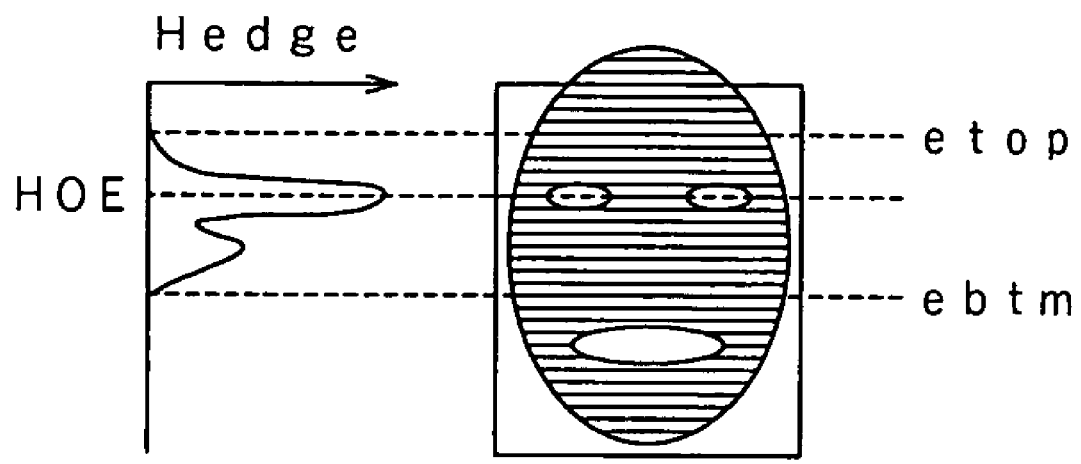
FIG. 22 is a schematic view showing the relationship between the eyes, mouth and the jaw of a person.

The strength edge (x,y) of the horizontal edges, calculated in the respective coordinates of the input color image data, is accumulated along the horizontal direction, so that a histogram Hedge(y), representing the horizontal edge in the vertical direction in the rectangular area, is calculated by the following equation (14):

$$\text{Hedge}(y) = \sum_{\substack{V3(n).stx \le x \le V3(n).edx \\ etop \le y \le ebtm}} \text{edge}(x, y) \quad (14)$$

where V3(n) is the coordinate of an apex point of the rectangular area for the skin color area n obtained in the skin color area detection unit 200. FIG. 22 schematically shows the generated histogram Hedge(y). The histogram Hedge(y) is smoothed by a one-dimensional low-pass filter, as necessary, for noise removal, and a vertical coordinate y, corresponding to the maximum value thereof, is detected as the height of an eye HOE.

If etbm, calculated by the above equation (13), is smaller than V3(n).sty of the coordinate of the apex point of the rectangular area surrounding the skin color area, the risk is high that the head top height TOH or the mouth height HOM has not been detected properly. In such case, a value invalid as the position coordinate, such as −1, may be stored in the coordinate V3(n) of the apex point of the rectangular area to correct the list of the apex points V.

The height of the eye HOE as detected is sent to the jaw detection unit 316, cheek detection unit 318 and to the decision unit 320. The corrected list of the apex. points V is sent to the jaw detection unit 316, centerline detection unit 317, cheek detection unit 318 and to the area correction unit 319.

(2-4) Detection of the Jaw of a Person

Figure 23:
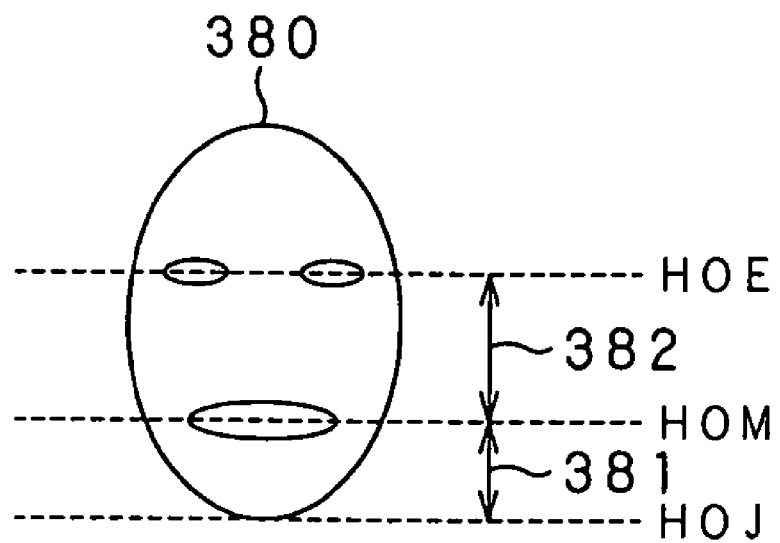
FIG. 23 is a schematic view showing the relationship between the histogram Hedge(y) generated on accumulating edge forming pixels in the horizontal direction and a rectangular area corresponding to a skin area.

The jaw detection unit 316 detects the height of the jaw for each skin color area having a noninvalid apex point coordinate in the corrected list of the apex points V3 corrected in the eye detection unit 315. For detecting the height of the jaw, estimation may be made by the following equation (15):

$$HOJ = HOM + (HOM - HOE) \times c \quad (15)$$

by assuming that, in a face 380 of a person, the ratio of the distance 381 between the jaw and the mouth to the distance 382 between the eye and the mouth is approximately constant, as shown for example in FIG. 23. In the above equation, c is a preset coefficient and HOJ is the height of the jaw. The height of the jaw HOJ as calculated is sent to the area correction unit 319.

(2-5) Detection of a Centerline of the Face of a Person

The centerline detection unit 317 then detects the position of the centerline dividing the face in the left and right directions for each skin color area having a noninvalid apex point coordinate in the corrected list of apex points V in the eye detection unit 315.

Figure 24:
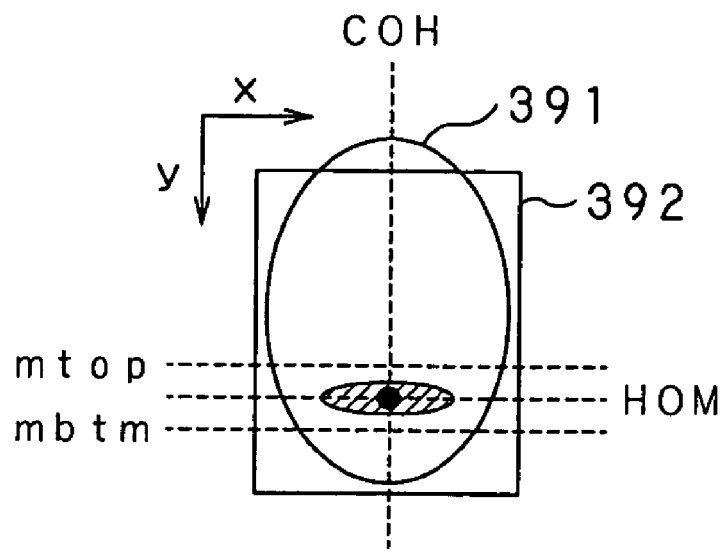
FIG. 24 is a schematic view showing the height of a mouth HOM in a rectangular area corresponding to the skin color area and areas of retrieval mtop, mbtm.
Figure 25:
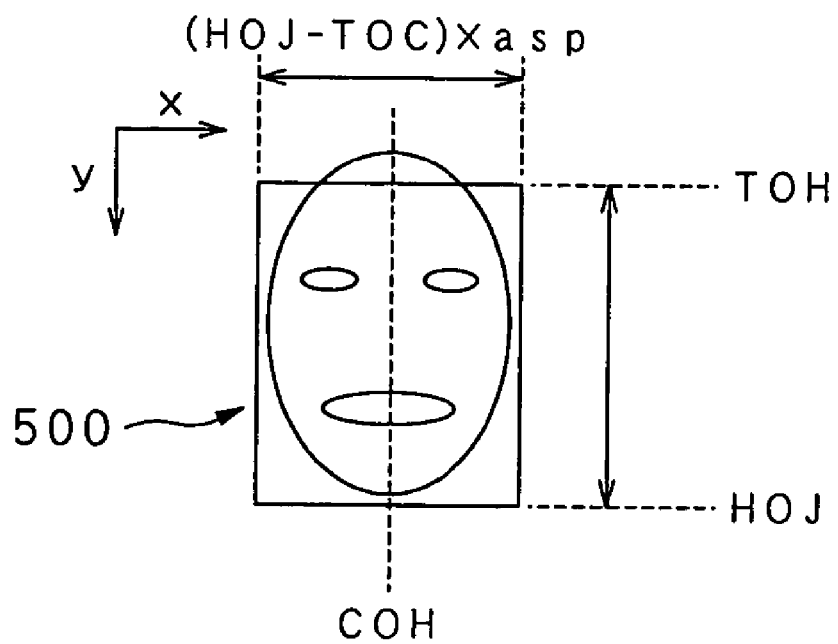
FIG. 25 is a schematic view showing coordinates of top points {(stx, sty), (edx, edy)} of an as-corrected rectangular area.

Here, the mouth search range in the coordinate in the vertical direction, about the height of mouth HOM, detected by the mouth detection unit 314, as center. This search range may be calculated from the width in the vertical direction of the rectangular area by the following equation (16):

$$\begin{cases} mtop = (V3(n).edy - V3(n).sty) \times m - HOM \\ mbtm = (V3(n).edy - V3(n).sty) \times m + HOM \end{cases} \quad (16)$$

as shown in FIG. 24. In the above equation, m is a preset coefficient and V3(n) is a coordinate of the apex point of the rectangular area corresponding to the skin color area n. It is noted that mtop and mbtm, as calculated from the above equation (16), are the lower and upper values of the y-coordinates of the search range, respectively.

The search range in the horizontal direction may be the width along the horizontal direction of the rectangular area. That is, the upper and lower limits of the x-coordinates may be the left end V3(n).stx and the right end V3(n).edx of the rectangular area, respectively.

FIG. 24 schematically shows the height of the mouth HOM and the search ranges mtop, mbtm in the rectangular area 392 for the skin color area 391.

The strength of redness for pixels present in the as-set search range and not included in the skin color area is then calculated, by the equation (11), and the average value of the horizontal coordinate of the pixels, the strength values of the redness of which become larger than a threshold value, are detected as the horizontal coordinate position COH of the centerline. By eliminating the pixels belonging to the skin color area in the calculations of the strength of the redness, it is possible to eliminate the effect of the pixels belonging to the skin color area, thus enabling highly accurate detection of the face centerline.

The position of the face centerline COH, thus detected, is sent to the area correction unit 319 and to the decision unit 320.

It is also possible to detect the position of average distribution of the skin color pixels in the skin color area and a straight line passing therethrough may be used as the face centerline.

(2-6) Detection of Cheek of a Person

The cheek detection unit 318 detects the cheek line from the color image data output from the image inputting unit 101 and from the skin color areas extracted by the skin color area detection unit 200.

Figure 26:
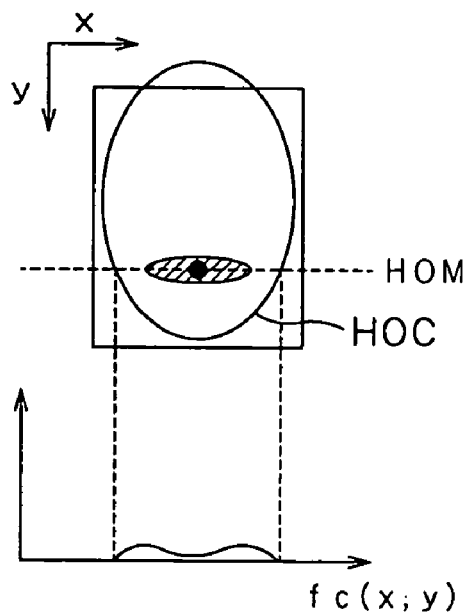
FIG. 26 is a schematic view showing a cheek line HOC from the histogram fc(x, y) along the width of the cheek.

First, the value fc (x,y) of the strength of the skin color is calculated for the respective pixels (x,y), in the rectangular area represented by the list of apex points V3(n), as shown in FIG. 26. The cheek detection unit 318 calculates the value fc(x,y) in the vertical direction, from line to line, and detects the boundary between the skin color area and the other area, while detecting the line of this boundary as the cheek line HOC. The line HOC of the cheek detected is sent to the decision unit 320 and to the face correction unit 400.

(2-7) Correction of the Rectangular Area

The area correction unit 319 re-calculates the rectangular area for each skin color area having a non-invalid apex point coordinate in the list of apex points V3, as corrected by the eye detection unit 315, and corrects the list of apex points V. The area correction unit 319 is able to set a rectangular area 500, using the height of the head top TOH, obtained by the head top detection unit 313, the height of the jaw HOJ, obtained by the jaw detection unit 316 and the position of the centerline COH, obtained by centerline detection.

That is, the two apex point coordinates {(stx, sty)}, {edx,edy}, indicating the as-corrected rectangular area 500, may be calculated by the following equation (17):

$$\begin{cases} stx = COH - \dfrac{(HOJ - TOH) \times asp}{2} \\ edx = COH - \dfrac{(HOJ - TOH) \times asp}{2} \\ sty = TOH \\ edy = HOJ \end{cases} \quad (17)$$

where asp is a coefficient indicating the ratio of the height to the width of the face of the person, that is, the aspect ratio. For this asp, a proper value is pre-set.

The apex point coordinate, newly calculated for the skin color area n, is overwritten on the list of apex points V and sent in this state to the decision unit 320.

(2-8) Face Decision

The decision unit 320 verifies, for each skin color area having a non-invalid apex point coordinate in the list of apex points V3, corrected by the area correction unit 319, whether or not the skin color area in question is the face area. Such decision of the face area may be made by exploiting the fact that horizontal edges are distributed more densely in eyes and at the mouth of the face area of a person and that the lip color is stronger in red color than in the remaining areas, and by verifying whether or not these conditions are met in the height of the mouth HOM detected by the mouth detection unit 314 and in the height of the eye HOE detected by the eye detection unit 315. The results of decision are output as two-valued flags faceflag indicating whether or not the area in question is a face area.

Thus, in the object detection unit 300, in which the position of the head top and the position of the mouth are detected for the extracted skin color area, and the search range for the eye is set from these positions to detect the eye position, the eye position can be detected extremely accurately.

Since the jaw position is calculated from the positions of the eyes and the mouth, the jaw position can be detected accurately even in such case where the difference in the color and luminance of the face and the neck is small to render it difficult to detect the position accurately.

In addition, since the face centerline is detected based on the strength of the redness of the mouth, the face centerline may be detected extremely accurately. Moreover, the decision unit 320 verifies the likeliness to the eye pattern or the likeliness to the mouth pattern to give comprehensive decision as to whether or not the area in question is a face, so that, if plural faces are involved, the results of decision as to whether or not the area in question is a face are high in reliability. Furthermore, the cheek line may be detected in the cheek detection unit 318.

On the other hand, should there exist plural skin color areas, determined to be a face by the decision unit 320, it is possible to provide a selector, not shown, for selecting a face area based on e.g. the face position from the plural face areas. Thus, a sole face area may be extracted from an image where there exist plural face areas to effect e.g. trimming. The decision unit 320 may also be provided with the function of selecting the face area.

(3) Face Correction Unit

In the face correction unit 400, the calculation unit 411 calculates the face length and the cheek width, the face classifying unit 412 classifies the face shape, and the first contour correction unit 413, second contour correction unit 414 and the third contour correction unit 415 correct the image of the image data of the person so that the cheek of the person will look slim, whereby a photo for identification may be produced which will be satisfactory for the person as the object.

The respective parts in the face correction unit 400 will now be explained in further detail.

(3-1) Calculations of the Face Length and the Cheek Width of a Person

The calculation unit 411 calculates the face length L1 from data of the jaw and the head top as entered from the object detection unit 300, while calculating the cheek width L2 at the mouth part from mouth and cheek data as entered from the object detection unit 300. This L1 is multiplied with a predetermined coefficient ▯to give a value L3. The value of ▯may be on the order of 0.5 and is set to correct the face length L1 to maintain a balance with respect to the cheek width L2.

(3-2) Face Classification

The face classifying unit 412 compares L2 to L3, based on the lengths L2 and L3 calculated by the calculation unit 411. If L2=L3, as shown in FIG. 2*a*, the face is classified as being round-faced, if L2<L3, as shown in FIG. 2*b*, the face is classified as long-faced, and if L2>L3, as shown in FIG. 2*c*, the face is classified as being square-faced. The results of classification are output to the first contour correction unit 413, second contour correction unit 414 and to the third contour correction unit 415.

(3-3a) Image Trimming

The person with the above-described round face is anxious that the face in its entirety looks plump and is desirous that the face in its entirety will look slim.

Figure 27:
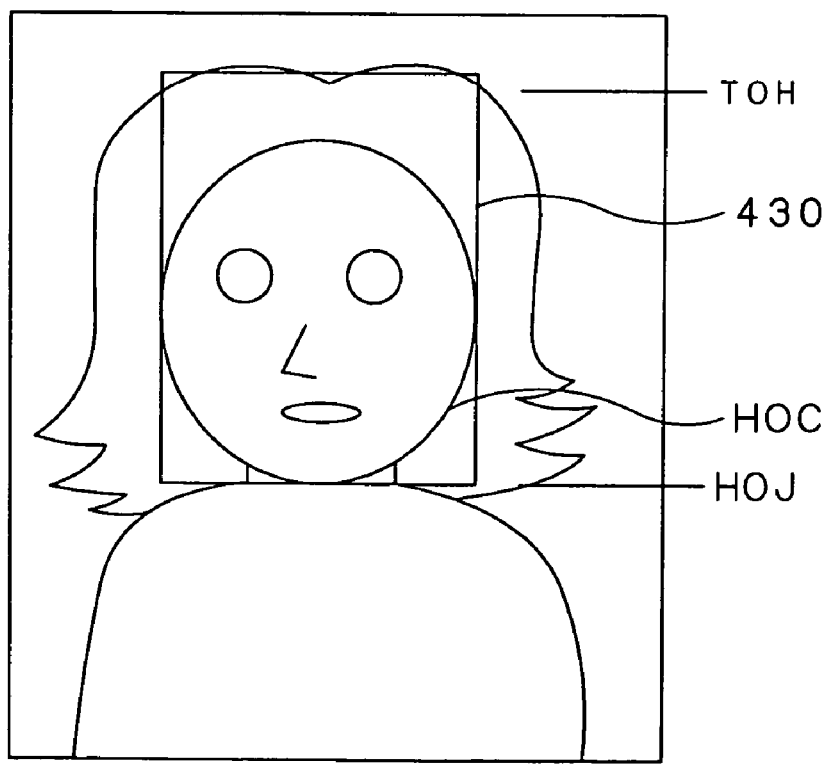
FIG. 27 is a schematic view for illustrating a face area to be subjected to image correction in a face correction unit.
Figure 28:
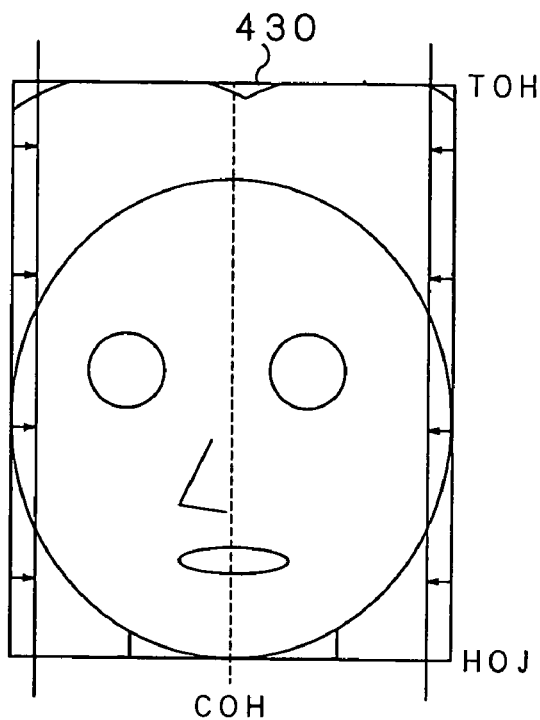
FIG. 28 is a schematic view for illustrating image adjustment of reducing the face area by the face correction unit.

Thus, the first contour correction unit 413 is supplied with image data of the person when the face classifying unit 412 has determined the person to be 'round-faced' and performs the processing of reducing the face area 430 by approximately 4% to 10% along the cheek width, as shown in FIGS. 27 and 28. It is noted that the face area 430 is a range from the position TOH of the head top to that of the jaw HOJ along the length of the face and a maximum width of the cheek line HOC along the cheek width.

Referring to FIG. 28, the first contour correction unit 413 reduces the image from both ends along the width of the cheek to the centerline COH of the face in a face area 430 of the image data of the person to output image data of the person with a trimmed image.

(3-3b) Image Trimming b

Figure 29:
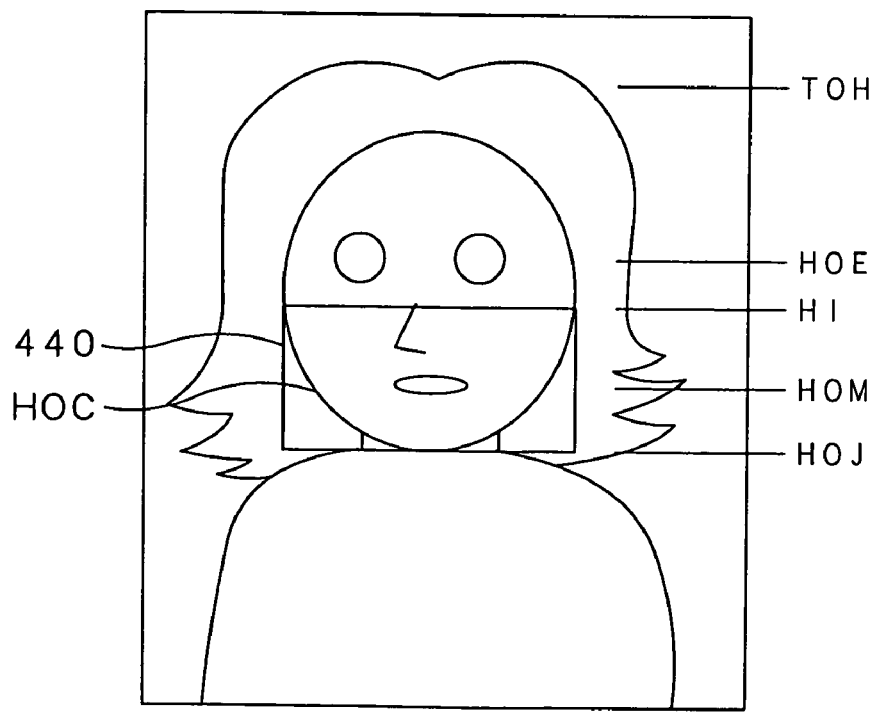
FIG. 29 is a schematic view for illustrating an area of a cheek to be subjected to image correction in the face correction unit.
Figure 30:
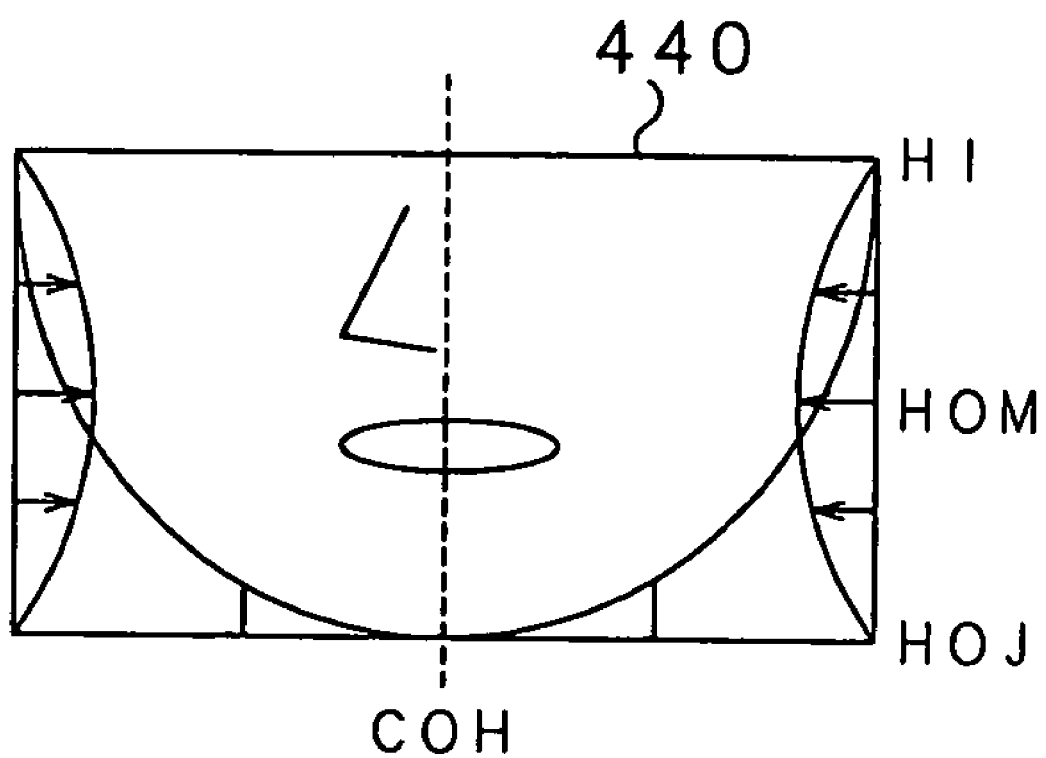
FIG. 30 is a schematic view for illustrating the image correction for reducing the cheek area in the face correction unit.

The person with a 'long face' is conscious of 'gilled' look and desires his/her cheek line to look slim. Hence, when the face shape has been classified into 'a long face' by the face classification unit 412, the second contour correction unit 414 is supplied with image data of a person and performs the processing of reducing the cheek line HOC along the cheek width, as shown in FIGS. 29 and 30. It is noted that a cheek part 440 is a range from H1 along the face length up to the jaw position HOJ, where H1 is a position one-third the length from the height of the eye HOE to a position of the mouth HOM, as measured from the side of the height of the eye HOE, with the range being such a range which maximizes the width of the cheek line HOC along the cheek direction.

Referring to FIG. 30, the second contour correction unit 414 reduces the image so that the reducing factor varies along the face direction from both width-wise ends of the cheek towards the face center, in the cheek part 440 of the image data of the person, and outputs the trimmed image data of the person.

Specifically, the second contour correction unit 414 trims the image as it continuously changes the reducing factor in the cheek part 440 so that the reducing factor at a position H1 along the face length is 0%, that at the height of the mouth HOM is 4 to 6% at the maximum and that at the height of the jaw HOJ is 0%, as shown in FIG. 30.

(3-3c) Image Trimming c

The person with a 'square face' is conscious of 'gilled' look and larger face and desires that his/her face in its entirety and the cheek line will look slim. Hence, if the face classifying unit 412 has classified the face to a 'square' face, the third contour correction unit 415 is supplied with image data of a person and performs the processing of reducing a face area 430 along the cheek width by approximately 4 to 10%, as shown in FIGS. 27 and 28, and of reducing the face area 430 by approximately 4 to 10%, as shown in FIGS. 29 and 30.

The third contour correction unit 415 reduces the image, in the face area 430 of the image data of the person, from both ends along the cheek width towards the centerline COH of the face, so that the reducing factor varies along the face length direction from both width-wise ends of the cheek towards the face center, in the cheek part 440 of the image data of the person, as shown in FIG. 30, and outputs the trimmed image data of the person.

Specifically, the third contour correction unit 415 trims the image as it continuously changes the reducing factor in the cheek part 440 so that the reducing factor at a position H1 along the face length is 0%, that at the height of the mouth HOM is 6 to 10% at the maximum and that at the height of the jaw HOJ is 0%, as shown in FIG. 30.

In this manner, the face correction unit 400 corrects the image, by the first contour correction unit 413, second contour correction unit 414, and the third contour correction unit 415, so that the cheek contour will look slim, based on the face shape as classified by the face classifying unit 412, to output an nice color image data with a slim looking cheek of the person.

With the above-described image processing unit 100, the image data of the person output on imaging, are trimmed so that the cheek of the person will look slim to yield image data of the person more attractive for the person as an object. The image processing unit 100 outputs the color image data, output from the face correction unit 400, to the first printer 18 or to the second printer 19.

With the imaging apparatus 1, according to the present invention, the image data of the person are trimmed so that the cheek will look slimmer, depending on the face shape of the person, so that a photo produced will be a nice one to the person as the object. If, in particular, the person as an object is a female, the photo produced will be satisfactory for her because the cheek line of concern may be corrected to look slim.

The foregoing explanation is directed to a photo booth for photo for identification, installed e.g. at a street corner. The present invention is, however, not limited to this and may, for example be applied to a photographic device installed on a photo studio, in a hospital or at a game center.

In the foregoing, the hardware architecture of the image processing unit 100 has been explained. The present invention is, however, not limited to this configuration and may be implemented by having the CPU 78 execute a computer program stating the optional processing. The computer program may be recorded on a recording medium and presented in this form, or transmitted over other transmitted mediums.

In the above embodiment, in continuously changing the reducing factor by way of image trimming, the skin color area on an inner side of the cheek line HOC may be varied in lightness to add a shade to the image, instead of reducing the image along the cheek width. In this case, the first contour correction unit 413, the second contour correction unit 414 and the third contour correction unit 415 of the image processing unit 100 add the shade so that the shade will be strongest in the vicinity of the cheek line HOC, with the lightness enhancing smoothly towards the face center. This yields a photo in which the cheek part of the person as the object will look slimmer.

In addition, since the image data of a person may be corrected in the above embodiment by image processing, it is possible to omit part or all of e.g. the illuminating devices.

In the above embodiment, the face shape is classified into three types by the face correction unit 400. The face shape may, however, be classified into more face shape types, using parameters as detected by the object detection unit 300, to carry out image correction responsive to the results of classification to provide photos which will be attractive for many users. By so doing, the image may be corrected so that the cheek of the person as the object will look slimmer to produce a good-looking photo of a person which will give an impression of a slim cheek at all times.

The present invention is not limited to the above-described embodiments and, as may be apparent to those skilled in the art, various changes, substitutions or equivalents may be made without departing from the scope of the invention as defined in the claims.

The invention claimed is:

1. An image processing apparatus comprising
face area extraction means for extracting a face area from an image of a person;
detection means for detecting the contour of the face of said person from the face area extracted by said face area extraction means;
face classification means for classifying the shape of the face of said person, based on the contour of the face of said person as detected by said detection means; and
image correcting means for correcting the contour of said face of said person based on the type of the face shape of said person classified by said face classification means.

2. The image processing apparatus according to claim 1 wherein said detection means detects the positions of the head top, eyes, mouth and the jaw, and the cheek; and wherein
said face classification means classifies the shape of the face of said person into at least three types of L2=L3, L2<L3 and L2>L3, wherein L1 is the length from the head top to the jaw of said person as detected by said detection means, L2 is the width of the cheek of said person at the position of his/her mouth as detected by said detection means, and L3 is said length L1 multiplied by a preset coefficient α.

3. The image processing apparatus according to claim 2 wherein said image correcting means effects image correction for reducing the width-wise direction of said face area when the face shape of the person as classified by said face classification means is L2=L3.

4. The image processing apparatus according to claim 2 wherein said image correcting means effects image correction for shading the contour portion of the face of said person in a range of said face area from a preset location between the eyes and the mouth up to the jaw of said person when the face shape of the person as classified by said face classification means is L2=L3.

5. The image processing apparatus according to claim 2 wherein said image correcting means effects image correction for reducing the width-wise direction of said face area in a range of said face area from a preset location between the eyes and the mouth up to the jaw of said person when the face shape of the person as classified by said face classification means is L2<L3.

6. The image processing apparatus according to claim 2 wherein said image correcting means effects image correction for shading the contour portion of the face of said person in a range of said face area from a preset location between the eyes and the mouth up to the jaw of said person when the face shape of the person as classified by said face classification means is L2<L3.

7. The image processing apparatus according to claim 2 wherein said image correcting means effects image correction for reducing the width-wise direction of said face area and image correction for reducing the width-wise direction of said face area in a range of said face area from a preset location between the eyes and the mouth up to the jaw of said person when the face shape of the person as classified by said face classification means is L2>L3.

8. The image processing apparatus according to claim 2 wherein said image correcting means effects image correction for reducing the width-wise direction of said face area and image correction for shading the contour portion of the face of said person in a range of said face area from a preset location between the eyes and the mouth up to the jaw of said person when the face shape of the person as classified by said face classification means is L2>L3.

9. An image processing method comprising
a face area extraction step for extracting a face area from an image of a person;
a detection step for detecting the contour of the face of said person from the face area extracted by said face area extraction step;
a face classification step for classifying the shape of the face of said person, based on the contour of the face of said person as detected by said detection step; and
an image correcting step for correcting the contour of said face of said person based on the type of the face shape of said person.

10. The image processing method according to claim 9 wherein said detection step detects the positions of the head top, eyes, mouth and the jaw, and the cheek; and wherein
said face classification step classifies the shape of the face of said person into at least three types of L2=L3, L2<L3 and L2>L3, wherein L1 is the length from the head top to the jaw of said person, L2 is the width of the cheek of said person at the position of his/her mouth, and L3 is said length L1 multiplied by a preset coefficient α.

11. The image processing method according to claim 10 wherein said image correcting step effects image correction for reducing the width-wise direction of said face area when the face shape of the person is L2=L3.

12. The image processing method according to claim 10 wherein said image correcting step effects image correction for shading the contour portion of the face of said person in a range of said face area from a preset location between the eyes and the mouth up to the jaw of said person when the face shape of the person as classified by said face classification step is L2=L3.

13. The image processing method according to claim 10 wherein said image correcting step effects image correction for reducing the width-wise direction of said face area in a range of said face area from a preset location between the eyes and the mouth up to the jaw of said person when the face shape of the person as classified by said face classification step is L2<L3.

14. The image processing method according to claim 10 wherein said image correcting step effects image correction for shading the contour portion of the face of said person in a range of said face area from a preset location between the eyes and the mouth up to the jaw of said person when the face shape of the person as classified by said face classification step is L2<L3.

15. The image processing method according to claim 10 wherein said image correcting step effects image correction for reducing the width-wise direction of said face area and image correction for reducing the width-wise direction of said face area in a range of said face area from a preset location between the eyes and the mouth up to the jaw of said person when the face shape of the person as classified by said face classification step is L2>L3.

16. The image processing method according to claim 10 wherein said image correcting step effects image correction for reducing the width-wise direction of said face area and image correction for shading the contour portion of the face of said person in a range of said face area from a preset location between the eyes and the mouth up to the jaw of said person when the face shape of the person as classified by said face classification step is L2>L3.

17. An imaging apparatus comprising
imaging means for imaging a person;
face area extraction means for extracting a face area from an image of a person imaged by said imaging means;
detection means for detecting the contour of the face of said person from the face area extracted by said face area extraction means;
face classification means for classifying the shape of the face of said person based on the contour of the face of said person detected by said detection means; and
image correction means for correcting the contour of said face of said person based on the type of the face of said face classified by said face classification means.

18. The imaging apparatus according to claim 17 wherein said detection means detects the positions of the head top, eyes, mouth and the jaw, and the cheek; and wherein
said face classification means classifies the shape of the face of said person into at least three types of L2=L3, L2<L3 and L2>L3, wherein L1 is the length from the head top to the jaw of said person as detected by said detection means, L2 is the width of the cheek of said person at the position of his/her mouth as detected by said detection means, and L3 is said length L1 multiplied by a preset coefficient α.

19. The imaging apparatus according to claim 18 wherein said image correcting means effects image correction for reducing the width-wise direction of said face area when the face shape of the person as classified by said face classification means is L2=L3.

20. The imaging apparatus according to claim 18 wherein said image correcting means effects image correction for shading the contour portion of the face of said person in a range of said face area from a preset location between the eyes and the mouth up to the jaw of said person when the face shape of the person as classified by said face classification means is L2=L3.

21. The imaging apparatus according to claim 18 wherein said image correcting means effects image correction for reducing the width-wise direction of said face area in a range of said face area from a preset location between the eyes and the mouth up to the jaw of said person when the face shape of the person as classified by said face classification means is L2<L3.

22. The imaging apparatus according to claim 18 wherein said image correcting means effects image correction for shading the contour portion of the face of said person in a range of said face area from a preset location between the eyes and the mouth up to the jaw of said person when the face shape of the person as classified by said face classification means is L2<L3.

23. The imaging apparatus according to claim 18 wherein said image correcting means effects image correction for reducing the width-wise direction of said face area and image correction for reducing the width-wise direction of said face area in a range of said face area from a preset location between the eyes and the mouth up to the jaw of said person when the face shape of the person as classified by said face classification means is L2>L3.

24. The imaging apparatus according to claim 18 wherein said image correcting means effects image correction for reducing the width-wise direction of said face area and image correction for shading the contour portion of the face of said person in a range of said face area from a preset location between the eyes and the mouth up to the jaw of said person when the face shape of the person as classified by said face classification means is L2>L3.

25. The imaging apparatus according to claim 17 further comprising printing means for printing an image of a person trimmed by said image correcting means.

26. The imaging apparatus according to claim 17 further comprising illuminating means for illuminating said person.

* * * * *